United States Patent
Ito et al.

(10) Patent No.: US 11,566,723 B2
(45) Date of Patent: *Jan. 31, 2023

(54) FLOW PATH SWITCHING VALVE AND MANUFACTURING METHOD THEREFOR

(71) Applicant: CKD Corporation, Komaki (JP)

(72) Inventors: Akihiro Ito, Komaki (JP); Masayuki Kouketsu, Komaki (JP); Keiichi Nishikawa, Komaki (JP); Yasuhisa Hirose, Komaki (JP); Takahiro Minatani, Komaki (JP)

(73) Assignee: CKD Corporation, Komaki (JP)

( * ) Notice: Subject to any disclaimer, the term of this patent is extended or adjusted under 35 U.S.C. 154(b) by 176 days.

This patent is subject to a terminal disclaimer.

(21) Appl. No.: 17/130,731

(22) Filed: Dec. 22, 2020

(65) Prior Publication Data

US 2021/0108737 A1 Apr. 15, 2021

Related U.S. Application Data

(60) Division of application No. 16/127,807, filed on Sep. 11, 2018, now Pat. No. 10,907,748, which is a
(Continued)

(30) Foreign Application Priority Data

Mar. 30, 2016 (JP) .............................. JP2016-068379
Jul. 25, 2016 (JP) .............................. JP2016-145726

(51) Int. Cl.
*F16K 31/06* (2006.01)
*F16K 3/18* (2006.01)
(Continued)

(52) U.S. Cl.
CPC ............ *F16K 31/0617* (2013.01); *F16K 3/18* (2013.01); *F16K 3/316* (2013.01); *F16K 11/0655* (2013.01); *F16K 31/06* (2013.01)

(58) Field of Classification Search
CPC .. F16K 11/07; F16K 11/0655; F16K 31/0613; F16K 31/0617; F16K 31/0655; Y10T 137/86839
(Continued)

(56) References Cited

U.S. PATENT DOCUMENTS 723,801 A ‡ 3/1903 Rauschenberg ........ F23L 15/02
137/310
2,690,529 A * 9/1954 Lindblad ............... H01F 7/1638
335/228
(Continued)

FOREIGN PATENT DOCUMENTS

CN 204141015 U 2/2015
CN 104896143 ‡ 6/2015
(Continued)

OTHER PUBLICATIONS

Korean Office Action from Korean Application No. 10-2020-7017226 dated Mar. 18, 2021.
(Continued)

*Primary Examiner* — Matthew W Jellett
(74) *Attorney, Agent, or Firm* — Beyer Law Group LLP

(57) ABSTRACT

A flow path switching valve includes (a) a valve body in a shape of a rectangular parallelepiped having a predetermined surface and an opposite surface, the valve body including an open flow passage having an opening on the predetermined surface, (b) a main body including a plurality of ports having a respective opening on a facing surface thereof facing the predetermined surface, and a plurality of connection flow passages each connected to respective one of the plurality of ports, (c) a pair of plate springs attached to opposite ends of the valve body to support the valve body with a predetermined gap formed between the predetermined surface and the facing surface, the plate springs applying elastic force to the valve body in accordance with
(Continued)

an amount of movement of the valve body in a predetermined direction, and (d) an actuator for reciprocating the valve body in the predetermined direction.

10 Claims, 29 Drawing Sheets

Related U.S. Application Data continuation of application No. PCT/JP2017/013413, filed on Mar. 30, 2017.

(51) Int. Cl.
*F16K 3/316* (2006.01)
*F16K 11/065* (2006.01)

(58) Field of Classification Search
USPC .................................. 251/129.07, 129.15
See application file for complete search history.

(56) References Cited

U.S. PATENT DOCUMENTS

| | | | | |
|---|---|---|---|---|
| 2,974,682 | A ‡ | 3/1961 | Trask .................... | F25B 13/00 137/625.33 |
| 2,983,286 | A * | 5/1961 | Greenawalt ............ | F16K 31/40 251/30.03 |
| 3,369,790 | A ‡ | 2/1968 | McHale ................ | F15B 13/043 251/78 |
| 3,400,736 | A ‡ | 9/1968 | Bastle ................... | F25B 41/046 137/625.29 |
| 3,773,082 | A ‡ | 11/1973 | Davis ................... | F16K 11/0655 137/625.48 |
| 3,894,561 | A ‡ | 7/1975 | Thornbery ............ | F16K 11/0655 137/625.29 |
| 4,138,089 | A ‡ | 2/1979 | McCarthy ............ | F16K 11/0655 137/625.48 |
| 4,327,774 | A ‡ | 5/1982 | Bauer ................... | F16K 11/065 137/625.43 |
| 4,340,202 | A * | 7/1982 | Hargraves ............ | F16K 11/065 137/625.29 |
| 4,463,332 | A | 7/1984 | Everett | |
| 4,569,504 | A ‡ | 2/1986 | Doyle ................... | H01F 7/1638 251/129.15 |
| 4,605,197 | A ‡ | 8/1986 | Casey ................... | F15B 13/0438 251/30.01 |
| 4,635,683 | A ‡ | 1/1987 | Nielsen ................ | H01F 7/13 137/625.65 |
| 4,644,760 | A ‡ | 2/1987 | Aoki .................... | F25B 41/046 137/625.43 |
| 4,664,136 | A ‡ | 5/1987 | Everett ................. | G05D 16/2022 137/85 |
| 4,669,504 | A | 6/1987 | Fujitsugu et al. | |
| 4,674,540 | A ‡ | 6/1987 | Takei ................... | B60T 8/364 137/596.17 |
| 4,682,135 | A * | 7/1987 | Yamakawa ............ | H01F 7/1638 335/274 |
| 4,712,582 | A * | 12/1987 | Marks .................. | F25B 41/26 335/278 |
| 4,988,074 | A ‡ | 1/1991 | Najmolhoda ......... | G05D 16/2024 251/129.08 |
| 5,070,908 | A ‡ | 12/1991 | Hahn ................... | F16K 11/0655 137/353 |
| 5,605,178 | A ‡ | 2/1997 | Jennins ................ | F16K 31/082 137/625.65 |
| 6,068,288 | A * | 5/2000 | Karolek ............... | F15B 13/0402 280/742 |
| 6,109,298 | A | 8/2000 | Kaneko et al. | |
| 6,182,942 | B1 * | 2/2001 | Kadlicko ............. | F15B 21/087 251/129.1 |
| 6,281,772 | B1 * | 8/2001 | Adams ................. | H01F 7/088 335/277 |
| 6,659,121 | B1 ‡ | 12/2003 | Takahashi ............ | F16K 31/0613 137/238 |
| 7,762,221 | B2 * | 7/2010 | Kira .................... | F01L 1/3442 123/90.15 |
| 7,776,221 | B2 | 7/2010 | Kira | |
| 7,845,370 | B2 ‡ | 12/2010 | Cook ................... | F15B 13/0402 137/625.65 |
| 7,896,029 | B2 ‡ | 3/2011 | Yoshimura .......... | F16K 11/0655 137/625.43 |
| 8,056,576 | B2 ‡ | 11/2011 | Van Weelden ...... | F16K 31/0613 137/107 |
| 8,579,250 | B1 ‡ | 11/2013 | Theobald ............ | F16K 31/0613 251/129.09 |
| 8,635,940 | B2 ‡ | 1/2014 | Goldfarb ............. | F15B 13/0402 91/464 |
| 9,127,779 | B2 | 9/2015 | Rivlin | |
| 9,620,274 | B2 | 4/2017 | Nagel | |
| 10,018,382 | B2 * | 7/2018 | Song ................... | F16K 31/363 |
| 10,344,887 | B2 | 7/2019 | Ito et al. | |
| 10,544,957 | B2 * | 1/2020 | Takeichi ............. | F25B 41/26 |
| 2002/0079472 | A1 * | 6/2002 | Kumar ................ | F16K 31/0693 251/129.07 |
| 2009/0294712 | A1 * | 12/2009 | Hutchings ........... | F16K 31/0672 251/129.15 |
| 2010/0276500 | A1 | 11/2010 | Rivlin | |
| 2012/0323379 | A1 * | 12/2012 | Robertson, III .... | F16K 31/0693 700/282 |
| 2016/0312908 | A1 * | 10/2016 | Thiery ................ | F16K 3/16 |
| 2018/0023723 | A1 | 1/2018 | Ito et al. | |
| 2018/0299173 | A1 * | 10/2018 | Huang ................ | F25B 41/26 |
| 2019/0011052 | A1 | 1/2019 | Ito et al. | |

FOREIGN PATENT DOCUMENTS

| | | |
|---|---|---|
| CN | 104896143 | 9/2015 |
| JP | S50-13963 B2 | 5/1975 |
| JP | 61-228176 A | 10/1986 |
| JP | 62-060780 U | 4/1987 |
| JP | H10-196831 A | 7/1998 |
| JP | H11-82767 A | 3/1999 |
| JP | 2007-211857 | 8/2007 |
| JP | 2008-259330 A | 10/2008 |
| JP | 2011-506861 A | 3/2011 |
| JP | 2016-53407 | 4/2016 |
| JP | 2017-187162 A | 10/2017 |
| TW | 416505 | 12/2000 |
| WO | WO-2016199946 A1 * | 12/2016 ............. F24F 11/83 |
| WO | 2017/170939 | 10/2017 |

OTHER PUBLICATIONS

Korean Office Action dated Apr. 30, 2018 from Korean Application No. 10-2017-0091854.
International Search Report from International Application No. PCT/JP2017/013413 dated May 30, 2017.
Office Action from U.S. Appl. No. 15/649,390 dated Jan. 23, 2019.
Notice of Allowance dated Apr. 25, 2019 for U.S. Appl. No. 15/649,390.
Chinese Office Action from Chinese Application No. 201780015954.1 dated Jun. 3, 2019.
International Search Report from International Application No. PCT/JP2018/038486 dated Dec. 25, 2018.
Restriction Requirement from U.S. Appl. No. 16/127,807 dated Apr. 1, 2020.
Office Action from U.S. Appl. No. 16/127,807 dated Jun. 5, 2020.
Taiwanese Office Action for Taiwanese Application No. 106118505 dated Jan. 22, 2019.
Chinese Office Action from Chinese Application No. 201780015954.1 from Apr. 2, 2020.
Chinese Office Action from Chinese Application No. 201710594480.2 dated Dec. 3, 2018.
IPRP from International Application No. PCT/JP2018/038486 dated Jun. 30, 2020.
Korean Office Action from Korean Application No. 10-2018-7025064 dated Sep. 7, 2020.

(56) References Cited

OTHER PUBLICATIONS

Taiwanese Office Action from Taiwanese Application No. 107138780 dated Nov. 24, 2020.
Office Action of the corresponding Taiwan Patent Application No. 108114654.
Taiwanese Office Action from Application No. 108114654 dated Apr. 19, 2021.
Notice of Allowance, U.S. Appl. No. 16/905,632, dated Dec. 10, 2021.

\* cited by examiner
‡ imported from a related application

FLOW PATH SWITCHING VALVE AND MANUFACTURING METHOD THEREFOR

CROSS-REFERENCE TO RELATED APPLICATIONS

This application is a Divisional of U.S. patent application Ser. No. 16/127,807, filed on Sep. 11, 2018, which is a Continuation of International Patent Application No. PCT/JP2017/013413, filed on Mar. 30, 2017, which in turn claims priority to Japan Patent Application No. 2016-068379 filed on Mar. 30, 2016 and Japan Patent Application No. 2016-145726 filed on Jul. 25, 2016. The entire contents of all of these applications are incorporated by reference in this specification.

BACKGROUND OF THE INVENTION

1. Field of the Invention

The present invention relates to a flow path switching valve for switching a flow path for a fluid.

2. Description of the Related Art

A conventional flow path switching valve of such a type includes a spool having a flow passage for fluid formed on its outer circumferential surface, and a sleeve which has a plurality of ports for allowing inflow and outflow of the fluid and which slidably houses the spool (see Japanese Patent Application Laid-Open No. 2007-211857). In the valve described in Japanese Patent Application Laid-Open No. 2007-211857, the flow path for the fluid is switched by reciprocating the spool in the axial direction.

BRIEF DESCRIPTION OF THE INVENTION

Incidentally, in the valve described in Japanese Patent Application Laid-Open No. 2007-211857, the spool and the sleeve rub against each other upon switching of the fluid flow path. Therefore, when the spool is driven, frictional force is produced, thereby lowering responsiveness in switching of the fluid flow path.

The present invention has been accomplished in view of such circumstances, and its main object is to provide a flow path switching valve which can improve the responsiveness in switching the fluid flow path.

In order to solve the above-described problem, the present invention employs the following means.

The first aspect of the present invention is a flow path switching valve for switching a flow path for a fluid. The flow path switching valve comprises a valve body, a main body, a pair of plate springs, and an actuator. The valve body is in a shape of a rectangular parallelepiped which has a predetermined surface and an opposite surface located opposite the predetermined surface. The valve body includes an open flow passage which is open to a predetermined surface of the valve body, where the opening has a predetermined length in a predetermined direction. The valve body has a pair of opposite ends along the predetermined direction. The main body includes a plurality of ports arranged in the predetermined direction at intervals shorter than the predetermined length. The plurality of ports have a respective opening on a facing surface of the main body facing the predetermined surface. The main body also includes a plurality of connection flow passages each connected to respective one of the plurality of ports. The pair of plate springs are attached to the opposite end portions of the valve body, respectively, so as to support the valve body such that a predetermined gap is formed between the predetermined surface and the facing surface. The plate springs apply elastic force to the valve body in accordance with an amount of movement of the valve body in the predetermined direction. The actuator reciprocates the valve body in the predetermined direction.

According to the above-described configuration, through the connection flow passages formed in the main body, the fluid can be caused to flow into and flow out of the respective ports connected to the respective connection flow passages. The valve body has an open flow passage which is open to a predetermined surface of the valve body over a predetermined length in a predetermined direction. The main body has a plurality of ports formed at intervals in the predetermined direction shorter than the predetermined length and being open to a facing surface of the main body facing the predetermined surface. Therefore, the state of connection of the plurality of ports through the open flow passage; i.e., the flow path for the fluid, can be switched by reciprocating the valve body in the predetermined direction by the actuator.

Plate springs are attached to opposite end portions of the valve body in the predetermined direction, respectively, and the plate springs support the valve body such that a predetermined gap is formed between the predetermined surface and the facing surface. Therefore, the valve body can be reciprocated in a state in which the valve body and the main body do not rub against each other. Accordingly, it is possible to prevent generation of frictional force during drive of the valve body and improve the responsiveness in switching the flow path for the fluid. Further, since the plate springs apply elastic force to the valve body in accordance with the amount of movement of the valve body in the predetermined direction, the elastic force of the plate springs can be utilized for control of the amount of movement of the valve body.

In accordance with one embodiment of the present invention, the open flow passage of the valve body if formed through the valve body so as to have a second opening on the opposite surface. The second opening may have a predetermined length in the predetermined direction. The flow path switching valve further comprises a second main body including a plurality of second ports and a plurality of second connection passages. The plurality of second ports are arranged in the predetermined direction at intervals shorter than the predetermined length, each second port having a respective opening on a second facing surface of the second main body facing the opposite surface. Each of the plurality of connection flow passages is connected to respective one of the plurality of second ports. The pair of plate springs are attached to the opposite ends of the valve body such that a second predetermined gap is also formed between the opposite surface and the second facing surface.

In the configuration in which the opposite end portions of the valve body are supported by the plate springs, the valve body may move in a direction away from the ports due to the pressure of the fluid flowing from the ports toward the valve body.

In this regard, according to the above-described configuration, the first main body and the second main body are provided on opposite sides of the valve body. A plurality of ports are formed in the first main body, and a plurality of ports which are the same as the ports of the first main body are formed in the second main body. Therefore, when the same fluid is caused to flow through a port of the first main body and flow through a port of the second main body, which corresponds to the port of the first main body, the pressure produced by the fluid flowing from the port of the first main body toward the valve body and the pressure produced by the fluid flowing from the port of the second main body toward the valve body can be canceled out. Accordingly, it is possible to prevent the valve body from moving in a direction away from the ports due to the pressure of the fluid flowing from the ports toward the valve body.

Further, the plate springs support the valve body such that a first predetermined gap is formed between the predetermined surface and the first facing surface and a second predetermined gap is formed between the opposite surface and the second facing surface. Therefore, the valve body can be reciprocated in a state in which the valve body does not rub against the first main body and the second main body.

Specifically, according to one embodiment of the present invention, there can be employed a configuration in which each plate spring is attached to the main body such that main faces of the plate spring which have a largest area extend perpendicularly to the predetermined direction. By virtue of such a configuration, it is possible to easily realize a structure in which the plate springs support the valve body such that the predetermined gap between the predetermined surface of the valve body and the facing surface of the main body is maintained, and the plate springs apply to the valve body only elastic force in the predetermined direction.

In accordance with one embodiment of the present invention, a movable element may be fixed to a portion of the valve body, which portion is located between the plate springs; and the actuator reciprocates the valve body in the predetermined direction in a non-contact state by an electromagnetic force applied to the movable element in a region between the plate springs in the predetermined direction.

According to the above-described configuration, the valve body is driven by the actuator in the predetermined direction in a non-contact state by means of the electromagnetic force applied to the movable element fixed to the valve body. As a result, no frictional force is generated during drive of the valve body, whereby the responsiveness in driving the valve body can be improved. Also, since the movable element to which electromagnetic force is applied and the valve body can be formed as separate members, the degree of freedom in designing the valve body can be increased.

Furthermore, since the opposite end portions of the valve body are supported by the plate springs, the electromagnetic force is applied to the movable element in a region located between the plate springs in the predetermined direction. Therefore, it is possible to prevent swaying of the valve body when the valve body is driven.

In accordance with one embodiment of the present invention, in the actuator, a position of the valve body in a state in which the plate springs support the valve body in their natural state is set to a neutral position at which the electromagnetic force for reciprocating the valve body in the predetermined direction is not applied.

According to the above-described configuration, in a state in which the plate springs support the valve body in the natural state and no electromagnetic force is applied by the actuator, the valve body can be maintained at the neutral position in the predetermined direction. Therefore, by controlling the electromagnetic force applied to the movable element while using the neutral position as a reference, the valve body can be easily reciprocated in the predetermined direction.

In accordance with one embodiment of the present invention, the actuator may include a movable rod which extends through the plate springs and the valve body and is attached to the valve body, and the actuator reciprocates the movable rod in the predetermined direction.

According to the above-described configuration, the movable rod of the actuator extends through the plate springs and the valve body and is attached to the valve body. Therefore, the predetermined surface of the valve body and the facing surface of the main body can be easily maintained parallel to each other.

In accordance with one embodiment of the present invention, the actuator may reciprocate the movable rod in a non-contact state by electromagnetic force.

According to the above-described configuration, the movable rod of the actuator is reciprocated in a non-contact state by electromagnetic force. Accordingly, generation of frictional force during drive of the valve body can be prevented in the actuator too, whereby the responsiveness in switching the flow path for the fluid can be improved further.

In accordance with one embodiment of the present invention, in the actuator, a position of the movable rod in a state in which the plate springs support the valve body in their natural state may be set to a neutral position at which the electromagnetic force for reciprocating the movable rod in the predetermined direction is not applied.

According to the above-described configuration, in a state in which the plate springs support the valve body in the natural state and no electromagnetic force is applied by the actuator, the movable rod can be maintained at the neutral position in the predetermined direction. Therefore, by controlling the electromagnetic force applied to the movable element while using the neutral position as a reference, the movable rod and thus the valve body can be easily reciprocated.

In accordance with one embodiment of the present invention, each of the predetermined surface and the facing surface may be finished to have a predetermined degree of flatness; and the plate springs support the valve body such that the predetermined surface and the facing surface have a predetermined degree of parallelism therebetween.

According to the above-described configuration, the degrees of flatness and parallelism of the predetermined surface of the valve body and the facing surface of the main body are controlled. Therefore, the accuracy of the predetermined gap formed between the predetermined surface and the facing surface can be improved.

Another aspect of the present invention provides a method for manufacturing the flow path switching valve of one or more of the above-described embodiments, characterized in that, after the plate springs are fixed to the main body in a state in which a gap jig having a thickness set on the basis of a size of the predetermined gap is inserted between the predetermined surface and the facing surface, the gap jig is removed.

According to the above-described process, a gap jig having a thickness set on the basis of the width of the predetermined gap is inserted between the predetermined surface of the valve body and the facing surface of the main body. Therefore, the spacing between the predetermined surface and the facing surface can be easily adjusted to the predetermined gap. Since the gap jig is removed after the plate springs are fixed to the main body in such a state, the predetermined gap can be easily formed between the predetermined surface and the facing surface.

BRIEF DESCRIPTION OF THE DRAWINGS

The above and other objects, features, and advantages of the present disclosure will be apparent from the following description when taken in conjunction with the accompanying drawings.

DETAILED DESCRIPTION OF EMBODIMENTS OF THE INVENTION

First Embodiment

A first embodiment of a flow path switching valve for switching between a flow passage for supplying air to a load (volume) and a flow passage for discharging air from the load will now be described with reference to the drawings.

Figure 1:
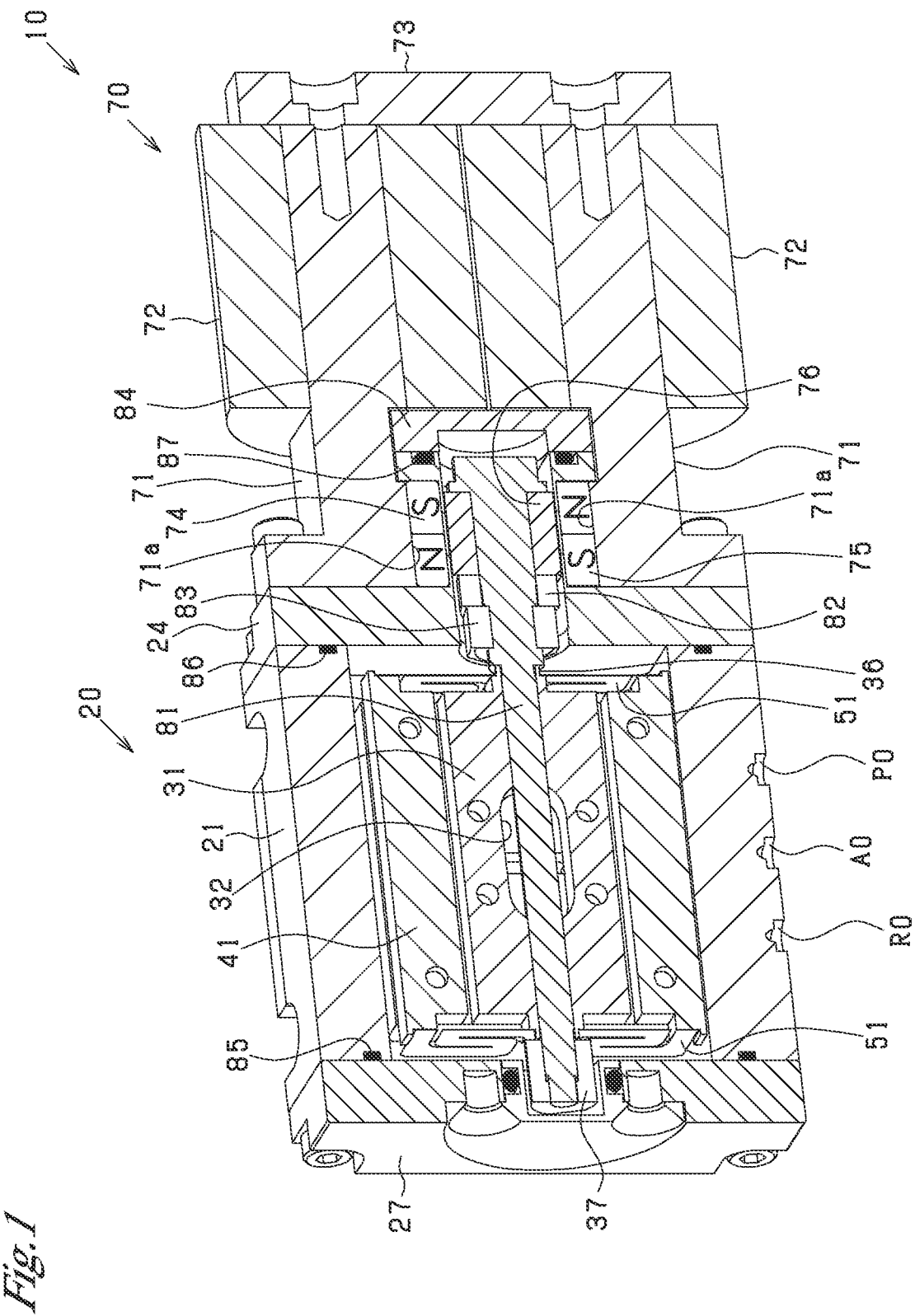
FIG. 1 is a perspective sectional view showing a flow path switching valve.

As shown in FIG. 1, the flow path switching valve 10 includes a valve mechanism 20 and an actuator 70. The valve mechanism 20 and the actuator 70 are connected to each other through a connection member 24. The actuator 70 drives the valve mechanism 20.

The valve mechanism 20 includes a housing 21, a valve body 31, a main body 41, plate springs 51, a cover 27, etc.

The housing 21 has a rectangular tubular shape. The housing 21 has a P0 port (pressurized air port) to which pressurized air (corresponding to fluid) is supplied, an A0 port (output port) from which air is supplied to the load and to which air is discharged from the load, and an R0 port (discharge port) from which air is discharged. The housing 21 has a pressurization flow passage, an output flow passage, and an air discharge flow passage which are connected to the P0 port, the A0 port, and the R0 port, respectively, and are open to the inner surface of the housing 21.

Figure 2:
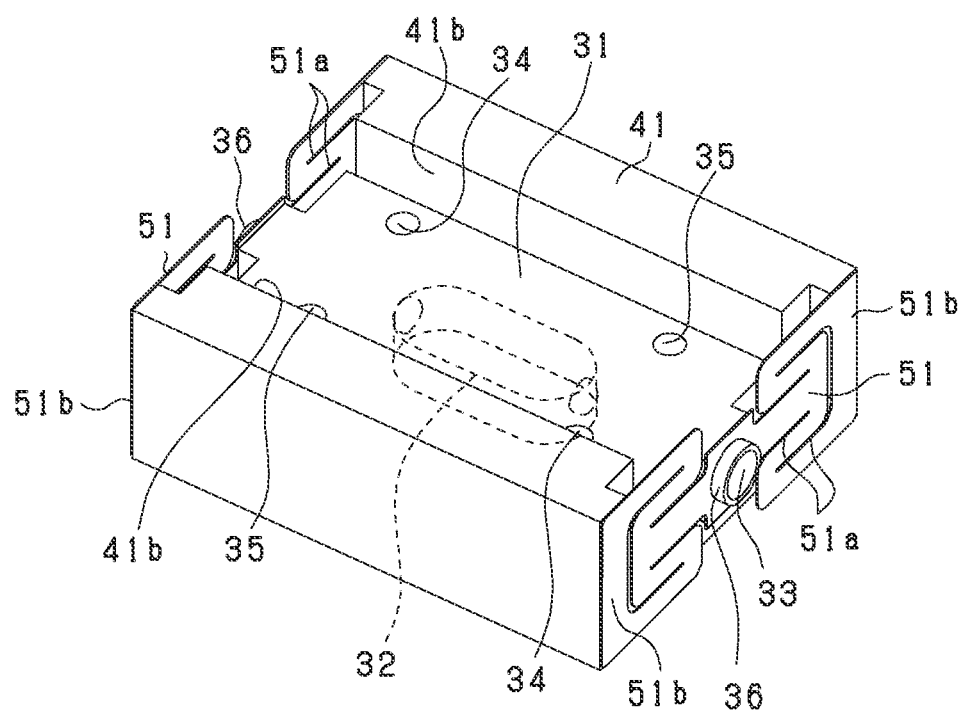
FIG. 2 is a perspective view showing a valve body, a main body, and plate springs of a first embodiment.
Figure 3:
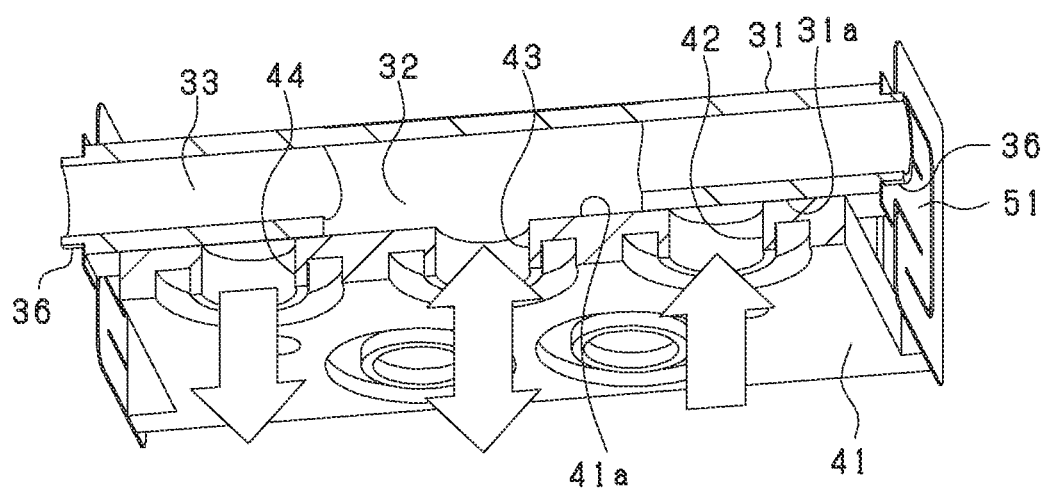
FIG. 3 is a sectional view showing the valve body, the main body, and the plate springs of the first embodiment.
Figure 4:
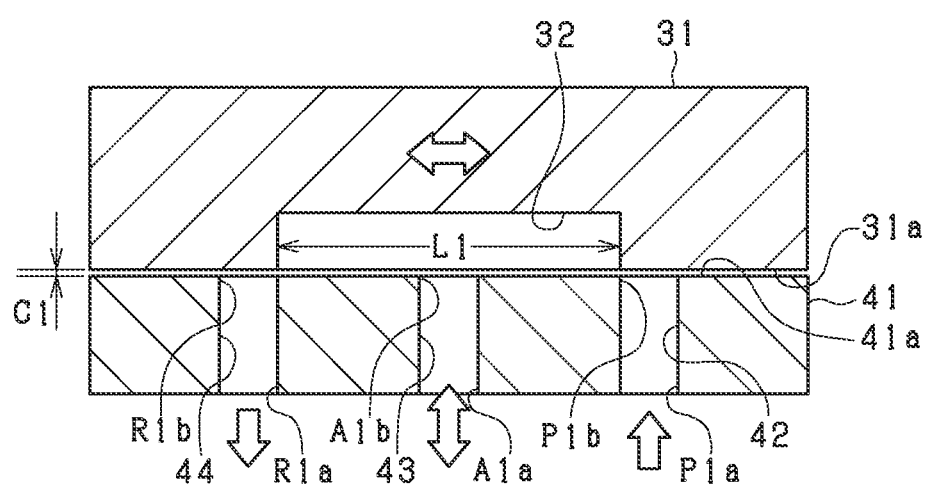
FIG. 4 is a schematic view showing the valve body and the main body of the first embodiment.

The valve body 31, the main body 41, the plate springs 51, etc. are disposed inside the housing 21. As shown in FIGS. 2 to 4, the main body 41 has a grooved shape (the shape of a rectangular tube having an open side). The main body 41 is fixed to the housing 21. The valve body 31 has the shape of a rectangular parallelepiped. The valve body 31 is disposed between inner side surfaces 41b of the main body 41 which face each other. A gap is formed between the outer side surface of the valve body 31 and each of the inner side surfaces 41b of the main body 41. Namely, the outer side surface of the valve body 31 does not contact with the inner side surfaces 41b of the main body 41.

As shown in FIG. 4, the valve body 31 has an open flow passage 32 which is formed on a predetermined surface 31a (specifically, the lower surface) of the valve body 31 and which is open over a predetermined length L1 in the longitudinal direction of the valve body 31 (corresponding to the predetermined direction). The open flow passage 32 is a recess in the shape of an oval hole whose length along the major axis is the predetermined length L1. As shown in FIGS. 2 and 3, the valve body 31 has a through hole 33 which extends therethrough in the longitudinal direction. The valve body 31 has pin holes 34 and screw holes 35 which extend therethrough in the vertical direction. Pin holes and screw holes are formed in a lower bottom portion of the main body 41 at positions corresponding to the pin holes 34 and the screw holes 35, respectively.

The lower bottom portion of the main body 41 has a P1b port, an A1b port, and an R1b port (corresponding to the plurality of ports) which are open to the facing surface 41a which faces the predetermined surface 31a of the valve body 31. The P1b port, the A1b port, and the R1b port are formed at intervals in the longitudinal direction of the valve body 31, which intervals are shorter than the predetermined length L1. The lower bottom portion of the main body 41 has connection flow passages 42, 43, and 44 which are connected to the P1b port, the A1b port, and the R1b port, respectively. The connection flow passages 42, 43, and 44 are open on the lower surface of the lower bottom portion of the main body 41. The openings of the connection flow passages 42, 43, and 44 on the lower surface of the lower bottom portion of the main body 41 serve as a P1*a* port, an A1*a* port, and an R1*a* port, respectively. The P1*a* port, the A1*a* port, and the R1*a* port are connected to the above-described pressurization flow passage, output flow passage, and air discharge flow passage, respectively.

As shown in FIGS. 1 and 2, the plate springs 51 are respectively attached to opposite end portions 36 of the valve body 31, which are located on the opposite sides in the longitudinal direction thereof. Each of the plate springs 51 is formed of a spring material such as spring steel and has the shape of a rectangular plate. Each plate spring 51 has slits 51*a* formed at predetermined positions. As a result of formation of the slits 51*a* in the plate springs 51, the plate springs 51 each have a predetermined meandering pattern. The thickness of the plate springs 51 is determined such that each of the plate springs 51 has a predetermined rigidity and generates a predetermined elastic force. Two short-side portions 51*b* of each plate spring 51 are fixed to the main body 41. Each plate spring 51 is fixed to the main body 41 such that its main faces (vertical surfaces in FIG. 2) having the largest area extend perpendicularly to the longitudinal direction of the valve body 31.

The predetermined surface 31*a* of the valve body 31 and the facing surface 41*a* of the main body 41 are finished to have a predetermined degree of flatness. The plate springs 51 support the valve body 31 such that the predetermined surface 31*a* and the facing surface 41*a* have a predetermined degree of parallelism therebetween. Specifically, the opposite longitudinal end portions 36 of the valve body 31 penetrate the centers of the plate springs 51 and are fixed thereto. As shown in FIG. 4, the plate springs 51 support the valve body 31 such that a predetermined gap C1 is formed between the predetermined surface 31*a* of the valve body 31 and the facing surface 41*a* of the main body 41. The size of the predetermined gap C1 is about 5 μm. A gap is formed between the main body 41 and a surface of the valve body 31 on the side opposite the predetermined surface 31*a*. Namely, the valve body 31 has no portion which is in sliding engagement with other members.

The plate springs 51 apply elastic force to the valve body 31 in accordance with the amount of movement of the valve body 31 in the longitudinal direction of the valve body 31 (a direction orthogonal to the main faces of the plate springs 51). Specifically, the plate springs 51 apply to the valve body 31 an elastic force which is proportional to the amount of movement of the valve body 31 in the longitudinal direction of the valve body 31.

Next, a method for manufacturing the valve mechanism 20 (the flow path switching valve 10) will be described.

First, a gap jig is disposed on the upper surface (the facing surface 41*a*) of the lower bottom portion of the main body 41. The thickness of the gap jig is set on the basis of the size of the predetermined gap C1. Namely, the thickness of the gap jig is determined such that the predetermined gap C1 is formed between the predetermined surface 31*a* of the valve body 31 and the facing surface 41*a* of the main body 41 after assembly of the valve mechanism 20.

Subsequently, the valve body 31 is disposed on the gap jig in such a manner that the gap jig is sandwiched between the facing surface 41*a* of the main body 41 and the lower surface (the predetermined surface 31*a*) of the valve body 31. At that time, a gap is formed between the inner surface 41*b* of the main body 41 and the outer surface of the valve body 31.

Subsequently, the opposite longitudinal end portions 36 of the valve body 31 are inserted into the through holes of the plate springs 51 formed at their centers. Central portions of the plate springs 51 are then fixed to the end portions 36 of the valve body 31 by means of welding. Also, the short-side portions 51*b* of the plate springs 51 are fixed to the main body 41 by means of welding.

Subsequently, the gap jig is removed from the main body 41 and the valve body 31. Thus, the assembly of the main body 41, the valve body 31, and the plate springs 51 is completed.

Figure 5:
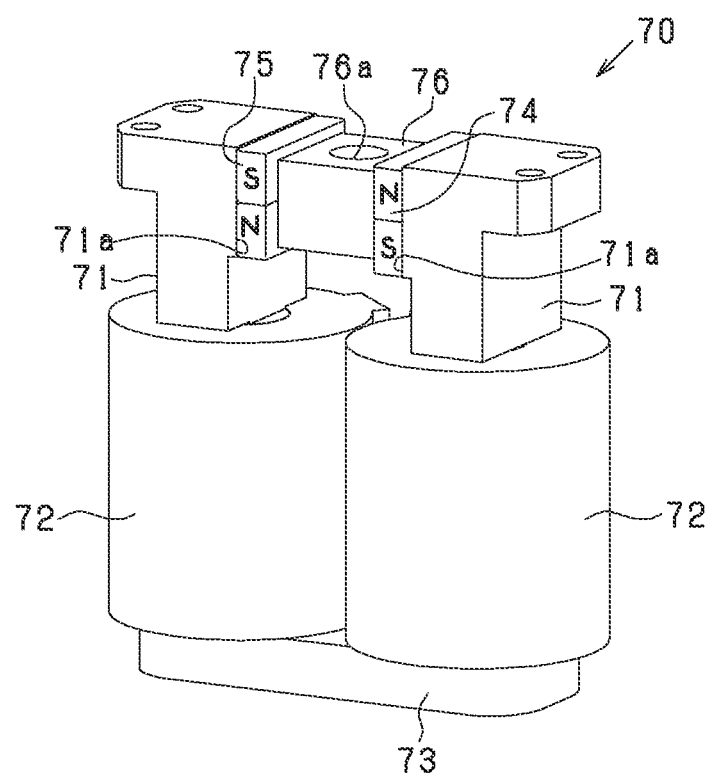
FIG. 5 is a perspective view showing an actuator.

Next, the structure of the actuator 70 will be described with reference to FIGS. 1 and 5. The actuator 70 includes cores 71, coils 72, a cover 73, magnets 74 and 75, a movable element 76, a movable rod 81, etc.

Each of the cores 71 is formed of a paramagnetic material and has the shape of a quadrangular prism. The coils 72 are wound around the outer circumferences of the cores 71. The paired cores 71 and coils 72 are disposed parallel to each other (juxtaposed to each other). The pared cores 71 are connected to each other through the cover 73. The cover 73 is formed of a paramagnetic material and has a plate-like shape.

One end portions of the cores 71 protrude from the coils 72. The one end portions of the cores 71 have respective parallel portions 71*a* which are flat surfaces parallel to each other.

The magnets 74 and 75 are attached to the pair of parallel portions 71*a*. The magnets 74 and 75 are permanent magnets formed of a ferromagnetic material. Each of the magnets 74 and 75 has the shape of a rectangular parallelepiped. The magnets 74 and 75 are attached to the parallel portions 71*a* of the cores 71 such that their N and S poles are arranged in the axial direction of the cores 71 (the longitudinal direction of the valve body 31). The N pole of the magnet 74 and the S pole of the magnet 75 face each other, and the S pole of the magnet 74 and the N pole of the magnet 75 face each other. Namely, the magnets 74 and 75 are disposed such that the order of arrangement of the poles of the magnet 74 in the axial direction of the cores 71 is reverse to that of the poles of the magnet 75. The surfaces of the magnets 74 and 75 which face each other are parallel to each other.

The movable element 76 is disposed between the magnet 74 and the magnet 75 via a portion of the above-described connection member 24. The connection member 24 is formed of a non-magnetic material. A portion of the connection member 24, which portion is disposed between the magnet 74 and the magnet 75, is formed to be thin so that magnetic fluxes easily pass through that portion. The movable element 76 is formed of a paramagnetic material and has the shape of a quadrangular prism. The movable element 76 has a through hole 76*a* which extends through the movable element 76 in the longitudinal direction of the valve body 31 (the axial direction of the movable element 76).

The movable rod 81 of the actuator 70 extends through the through hole 76*a* of the movable element 76. The movable rod 81 is formed of a non-magnetic material and has a circular columnar shape. The movable rod 81 has a small diameter portion, an intermediate diameter portion, and a large diameter portion. The small diameter portion extends through the two plate springs 51 and the through hole 33 of the valve body 31, and the intermediate diameter portion extends through the through hole 76*a* of the movable element 76. One end portion 36 of the valve body 31 is in contact with a stepped portion between the small diameter portion and the intermediate diameter portion.

In the longitudinal direction of the valve body 31, the movable element 76 is located at the center positions of the magnets 74 and 75 (its neutral position) due to the magnetic forces of the magnets 74 and 75. In order that the movable element 76 is fixed to the movable rod 81 in this state, the relative position of the movable element 76 and the movable rod 81 is adjusted by a spacer 82. The movable element 76 or the spacer 82 is brought into engagement with a step between the intermediate diameter portion and the large diameter portion of the movable rod 81, and a nut 83 is attached to the intermediate diameter portion for fastening, whereby the movable element 76 is attached to the movable rod 81.

Also, in a state in which the two plate springs 51 are in their natural state, the small diameter portion of the movable rod 81 extends through the valve body 31 and the two plate springs 51. In this state, a nut 37 is attached to a distal end of the small diameter portion for fastening, whereby the small diameter portion is attached to the valve body 31. Namely, in the actuator 70, the positions of the movable element 76 and the movable rod 81 in a state in which the plate springs 51 support the valve body 31 in the natural state are set to a neutral position at which the electromagnetic force for reciprocating the movable rod 81 (the movable element 76) in the longitudinal direction of the valve body 31 is not applied. A gap is formed between the nut 37 and the cover 27, and the nut 37 is not in contact with the cover 27.

An end portion of the large diameter portion of the movable rod 81 is covered with an end member 84. The end member 84 is formed of a non-magnetic material. A space which is defined by the cover 27, the housing 21, the connection member 24, and the end member 84 and in which the main body 41, the valve body 31, the movable rod 81, the movable element 76, etc. are accommodated is kept airtight (sealed) by O-rings 85, 86, and 87 (seal members). A gap is formed between "the movable rod 81, the movable element 76, the spacer 82, and the nut 83" and "the connection member 24 and the end member 84." Namely, the movable rod 81, the movable element 76, the spacer 82, and the nut 83 are not in contact with the connection member 24 and the end member 84.

Next, the principle of reciprocating the movable rod 81 and the valve body 31 in the longitudinal direction of the valve body 31 by the actuator 70 will be described with reference to FIGS. 6 to 8.

Figure 6:
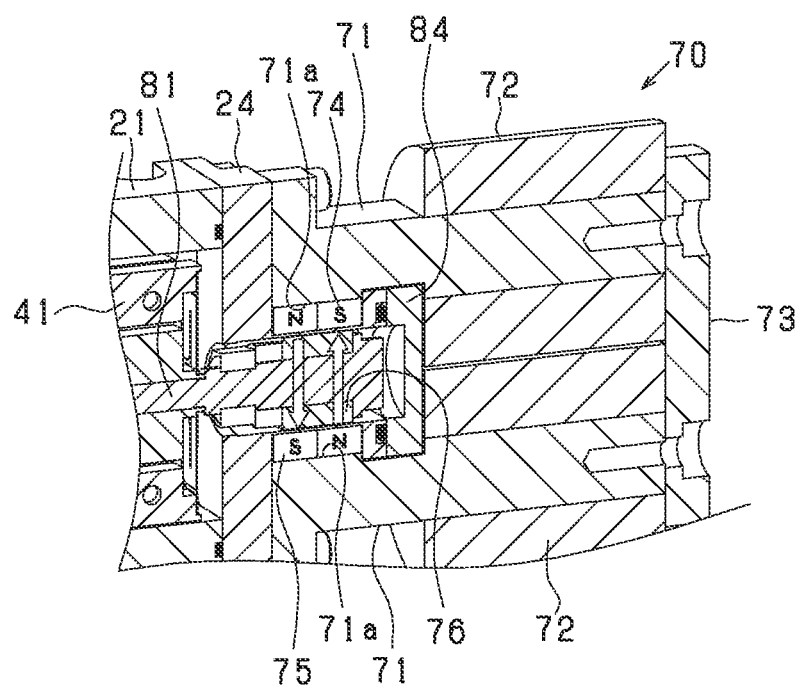
FIG. 6 is a perspective sectional view showing the actuator in an unexcited state.

In an unexcited state in which no current is supplied to the coils 72 of the actuator 70, as shown in FIG. 6, a magnetic field extending from the N pole of the magnet 74 toward the S pole of the magnet 75 and a magnetic field extending from the N pole of the magnet 75 toward the S pole of the magnet 74 are generated. In this state, the movable element 76 is at rest in the neutral position in the axial direction of the movable rod 81 (the longitudinal direction of the valve body 31) because the generated magnetic fields are in balance. In this state, since the plate springs 51 are in the natural state, no force is applied from the plate springs 51 to the movable rod 81. Also, in this state, the P1*b* port and the R1*b* port of the main body 41 are closed by the valve body 31 as shown in FIG. 4.

Figure 7:
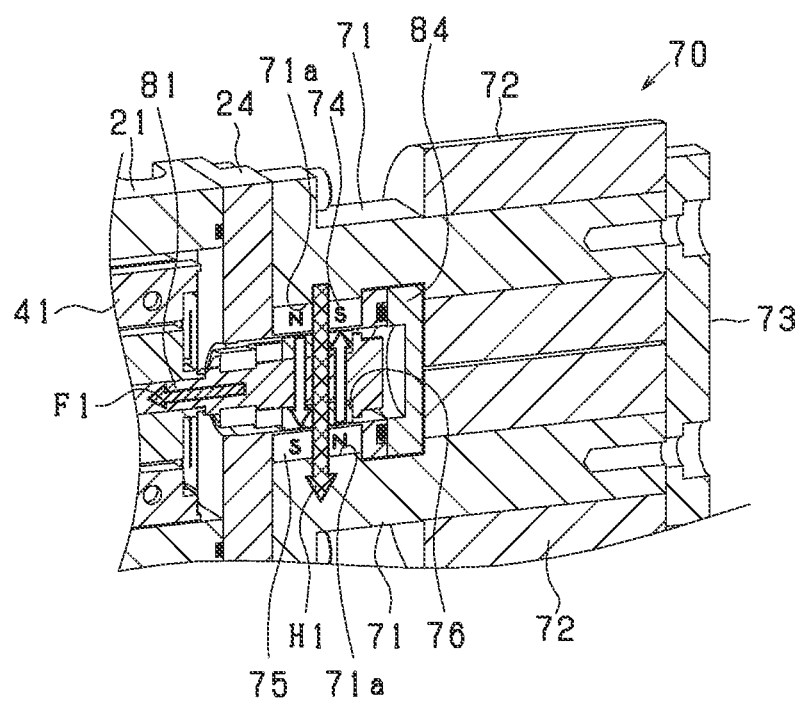
FIG. 7 is a perspective sectional view showing the actuator in a positive direction excited state.

In a positive direction excited state in which a current of a positive direction is supplied to the coils 72 of the actuator 70, a coil magnetic field extending from the parallel portion 71*a* of the upper core 71 toward the parallel portion 71*a* of the lower core 71 is generated as indicated by an arrow H1 in FIG. 7. Therefore, the magnetic field extending from the N pole of the magnet 74 toward the S pole of the magnet 75 and the coil magnetic field strengthen each other, and the magnetic field extending from the N pole of the magnet 75 toward the S pole of the magnet 74 and the coil magnetic field weaken each other. As a result, the movable element 76 receives a magnetic attraction force toward the valve body 31. Thus, as indicated by an arrow F1, the movable rod 81 and the valve body 31 move, together with the movable element 76, in the direction of the arrow F1. At that time, by means of electromagnetic force, the actuator 70 drives the movable rod 81 in a non-contact state, whereby the valve body 31 is driven without coming into contact with the main body 41. When the valve body 31 is driven, as indicated by arrows F3 in FIG. 9, the plate springs 51 apply to the valve body 31 a reaction force which is proportional to the amount of movement of the valve body 31. In FIG. 4, when the valve body 31 is moved leftward (toward the cover 27), the A1*b* port and the R1*b* port of the main body 41 are connected through the open flow passage 32 of the valve body 31. Namely, the flow passage of the flow path switching valve 10 is switched.

Figure 8:
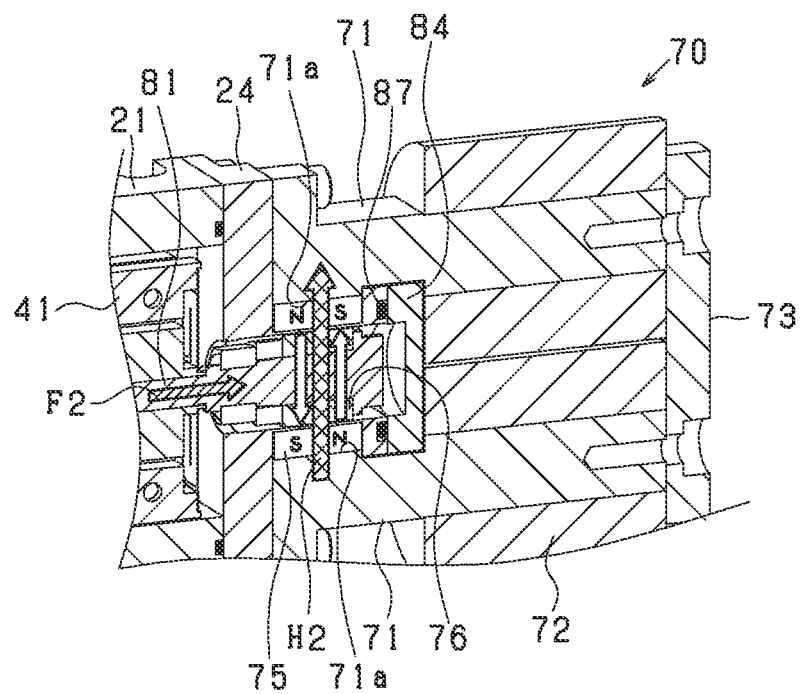
FIG. 8 is a perspective sectional view showing the actuator in a negative direction excited state.

In a negative direction excited state in which a current of a negative direction is supplied to the coils 72 of the actuator 70, a coil magnetic field extending from the parallel portion 71*a* of the lower core 71 toward the parallel portion 71*a* of the upper core 71 is generated as indicated by an arrow H2 in FIG. 8. Therefore, the magnetic field extending from the N pole of the magnet 74 toward the S pole of the magnet 75 and the coil magnetic field weaken each other, and the magnetic field extending from the N pole of the magnet 75 toward the S pole of the magnet 74 and the coil magnetic field strengthen each other. As a result, the movable element 76 receives a magnetic attraction force toward the end member 84 (the side opposite the valve body 31). Thus, as indicated by an arrow F2, the movable rod 81 and the valve body 31 move, together with the movable element 76, in the direction of the arrow F2. At that time, by means of electromagnetic force, the actuator 70 drives the movable rod 81 in a non-contact state, whereby the valve body 31 is driven without coming into contact with the main body 41. When the valve body 31 is driven, the plate springs 51 apply to the valve body 31 a reaction force which is proportional to the amount of movement of the valve body 31. In FIG. 4, when the valve body 31 is moved rightward (toward the end member 84), the A1*b* port and the P1*b* port of the main body 41 are connected through the open flow passage 32 of the valve body 31. Namely, the flow passage of the flow path switching valve 10 is switched.

The load generated by the plate springs 51 is in proportional to the stroke of the valve body 31. Also, the smaller the thickness of the plate springs 51, the longer the stroke for the same plate spring load.

Figure 10:
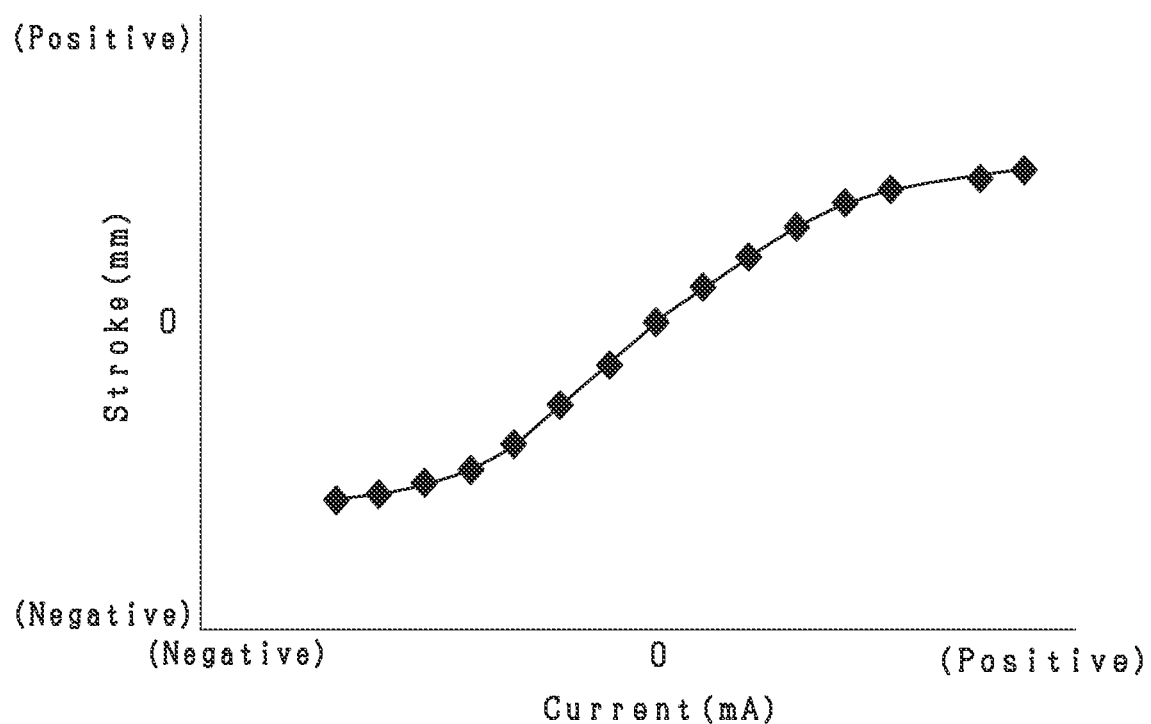
FIG. 10 is a graph showing a relation between current supplied to a coil and stroke of the valve body in the first embodiment.

FIG. 10 is a graph showing the relation between the current supplied to the coils 72 and the stroke of the valve body 31. The stroke in the positive direction increases as the current in the positive direction is increased, and the stroke in the negative direction increases as the current in the negative direction is increased.

Figure 11:
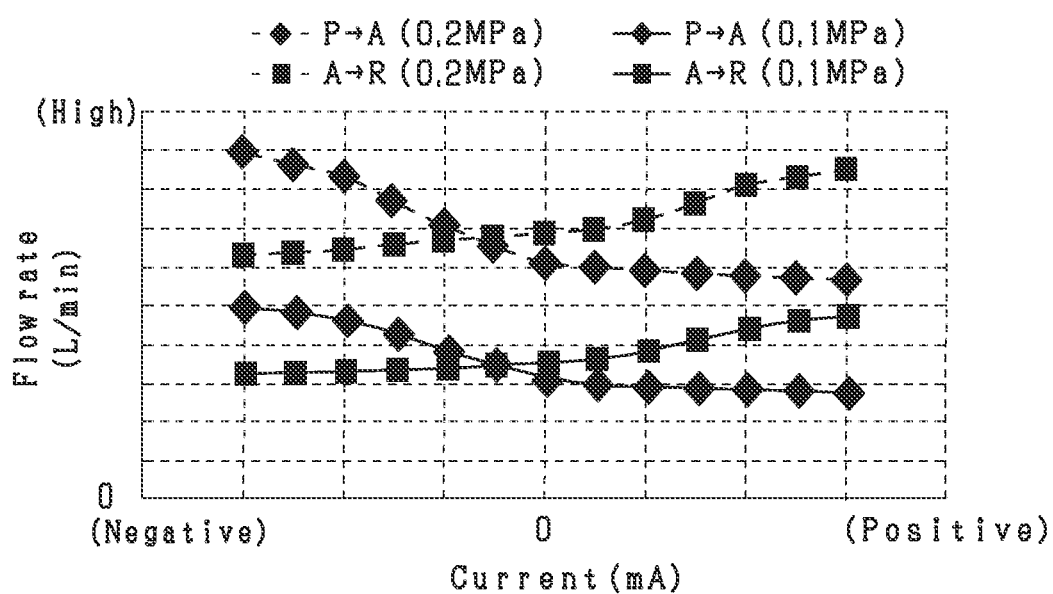
FIG. 11 is a graph showing a relation between current supplied to the coil and flow rate of air in the first embodiment.

FIG. 11 is a graph showing the relation between the current supplied to the coils 72 and the flow rate of air. Continuous lines show the results of an experiment performed for the case where the pressure of air is 0.1 MPa, and broken lines show the results of an experiment performed for the case where the pressure of air is 0.2 MPa. In both the case where the pressure is 0.1 MPa and the case where the pressure is 0.2 MPa, the flow rate from the A port (the A0 port) to the R port (the R0 port) increases as the current in the positive direction is increased, and the flow rate from the P port (the P0 port) to the A port (the A0 port) increases as the current in the negative direction is increased. In the case where the pressure is 0.2 MPa, the flow rate for the same current is greater than that in the case where the pressure is 0.1 MPa.

The present embodiment having been described in detail above has the following advantages.

The plate springs 51 are attached to the opposite end portions 36 of the valve body 31 located on opposite sides in the longitudinal direction of the valve body 31 (the predetermined direction). The plate springs 51 support the valve body 31 such that the predetermined gap C1 is formed between the predetermined surface 31a of the valve body 31 and the facing surface 41a of the main body 41. Therefore, the valve body 31 can be reciprocated in a state in which the valve body 31 and the main body 41 do not rub against each other. Accordingly, it is possible to prevent generation of frictional force during driving of the valve body 31 and improve the responsiveness in switching the flow path for air. Further, since the plate springs 51 apply elastic force to the valve body 31 in accordance with the amount of movement of the valve body 31 in the above-described predetermined direction, the elastic force of the plate springs 51 can be utilized for control of the amount of movement of the valve body 31.

The plate springs 51 are fixed to the main body 41 such that the main faces of the plate springs 51 having the largest area extend perpendicularly to the predetermined direction. Therefore, the plate springs 51 can easily realize a structure in which the plate springs 51 support the valve body 31, while maintaining the predetermined gap C1 between the predetermined surface 31a of the valve body 31 and the facing surface 41a of the main body 41, and apply to the valve body 31 only elastic force along the predetermined direction.

The actuator 70 includes the movable rod 81 which extends through the plate springs 51 and the valve body 31 and is attached to the valve body 31 and reciprocates the movable rod 81 in the predetermined direction. In this configuration, since the movable rod 81 of the actuator 70 extends through the plate springs 51 and the valve body 31 and is attached to the valve body 31, the predetermined surface 31a of the valve body 31 and the facing surface 41a of the main body 41 can be easily maintained parallel to each other.

The movable rod 81 of the actuator 70 is reciprocated in a non-contact state by means of electromagnetic force. Accordingly, even in the actuator 70, it is possible to prevent generation of frictional force during driving of the valve body 31, thereby further improving the responsiveness in switching the flow path for air.

In the actuator 70, the position of the movable rod 81 (the movable element 76) in a state in which the plate springs 51 support the valve body 31 in the natural state is set to the neutral position at which the electromagnetic force for reciprocating the movable rod 81 in the predetermined direction is not applied. By virtue of this configuration, in a state in which the plate springs 51 support the valve body 31 in the natural state and no electromagnetic force is applied by the actuator 70, the movable rod 81 can be maintained at the neutral position in the predetermined direction. Therefore, by controlling the electromagnetic force applied to the movable rod 81 while using the neutral position as a reference, the movable rod 81 and thus the valve body 31 can be easily reciprocated.

The predetermined surface 31a of the valve body 31 and the facing surface 41a of the main body 41 are finished to have a predetermined degree of flatness. The plate springs 51 support the valve body 31 such that the predetermined surface 31a and the facing surface 41a have a predetermined degree of parallelism therebetween. According to such a configuration, the degrees of flatness and parallelism of the predetermined surface 31a of the valve body 31 and the facing surface 41a of the main body 41 are controlled. Therefore, it is possible to increase the accuracy of the predetermined gap C1 formed between the predetermined surface 31a and the facing surface 41a.

Since the predetermined gap C1 is formed between the predetermined surface 31a of the valve body 31 and the facing surface 41a of the main body 41, even in a state in which the P1b port is not connected to the open flow passage 32 as shown in FIG. 4, air flowing from the P1b port toward the valve body 31 leaks through the predetermined gap C1. Since the size of the predetermined gap C1 is about 5 μm, the amount of air leaking through the predetermined gap C1 can be decreased.

Since a gap jig having a thickness set on the basis of the size of the predetermined gap C1 is inserted between the predetermined surface 31a and the facing surface 41a, the spacing between the predetermined surface 31a and the facing surface 41a can be easily adjusted to the predetermined gap C1. Since the gap jig is removed after the plate springs 51 are fixed to the main body 41 in such a state, the predetermined gap C1 can be easily formed between the predetermined surface 31a and the facing surface 41a.

Figure 9:
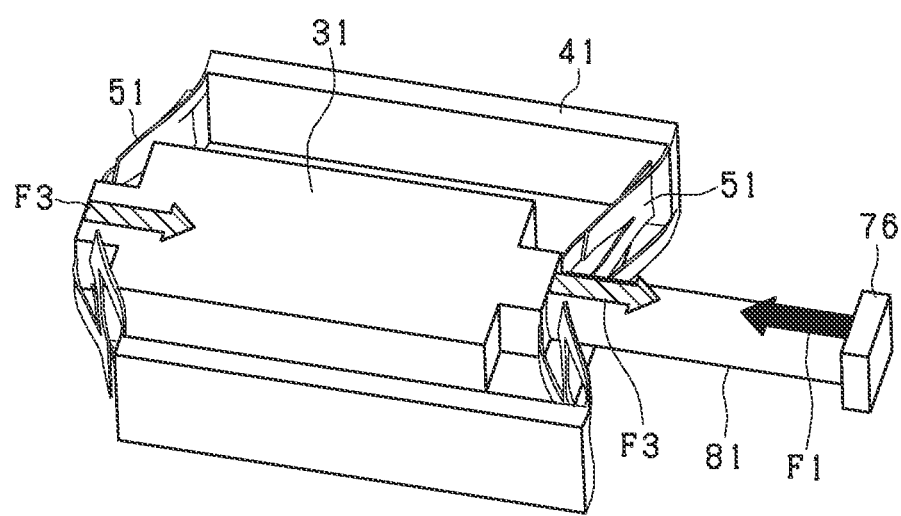
FIG. 9 is a schematic view showing deformation of the plate springs of the first embodiment.

As shown in FIG. 6, the magnets 74 and 75 have the shape of a rectangular parallelepiped. Therefore, as shown in FIGS. 8 and 9, when the actuator 70 is brought into an excited state, only magnetic forces in the directions indicated by arrows F1 and F2 act on the movable element 76 and the movable rod 81, and magnetic forces in the direction orthogonal to the predetermined surface 31a of the valve body 31 (the sheet on which FIGS. 8 and 9 are depicted) do not act on the movable element 76 and the movable rod 81. Accordingly, it is possible to prevent the movable rod 81 from shifting in the direction orthogonal to the predetermined surface 31a. In contrast, in the case where each of the magnets 74 and 75 has the shape of a semicylinder, the magnetic forces in the direction orthogonal to the predetermined surface 31a act on the movable element 76 and the movable rod 81, and due to the magnetic force imbalance, the movable rod 81 may shift in the direction orthogonal to the predetermined surface 31a.

In the above-described first embodiment, the amount of air leaking through the predetermined gap C1 is reduced by setting the size of the predetermined gap C1 to about 5 μm. However, as shown in FIG. 11, even when the magnitude of current is zero, a flow rate due to the leakage of air exists. In particular, in the case where the pressure of air is 0.2 MPa, the flow rate due to the leakage of air is greater than that in the case where the pressure of air is 0.1 MPa.

Conceivably, the above-mentioned phenomenon occurs for the following reason. In the structure in which the opposite end portions 36 of the valve body 31 are supported by the plate springs 51, as shown in FIG. 4, the valve body 31 moves in a direction away from the P1b port and the A1b port due to the pressure of air flowing from the P1b port and the A1b port toward the valve body 31. Namely, the pressure of air may widen the predetermined gap C1 between the predetermined surface 31a of the valve body 31 and the facing surface 41a of the main body 41.

Second Embodiment

Figure 12:
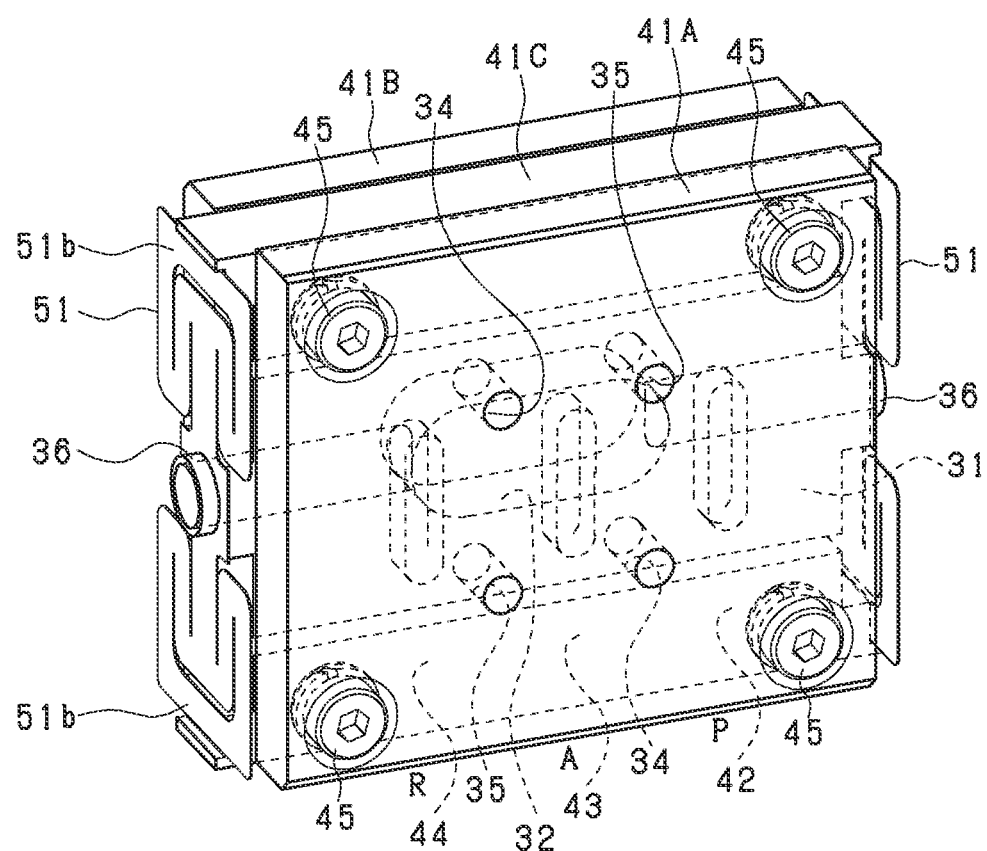
FIG. 12 is a perspective view showing a valve body, main bodies, and plate springs of a second embodiment.
Figure 13:
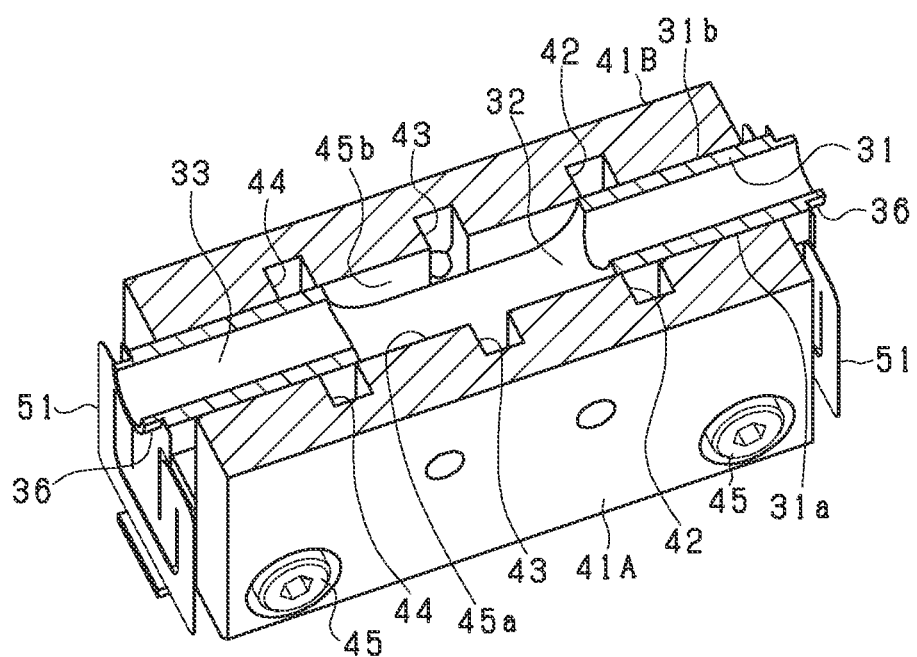
FIG. 13 is a sectional view showing the valve body, the main bodies, and the plate springs of the second embodiment.
Figure 14:
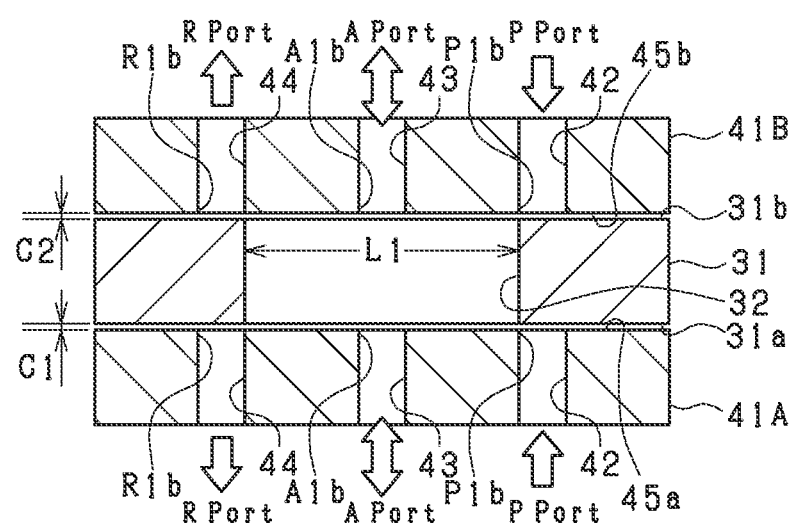
FIG. 14 is a schematic view showing the valve body and the main bodies of the second embodiment.

In order to overcome the above-mentioned drawback, in the present embodiment, a first main body 41A and a second main body 41B are provided on opposite sides of the valve body 31 as shown in FIGS. 12 to 14. In the below, a portion of the second embodiment different from that of the first embodiment will be mainly described. Notably, members which correspond to those of the first embodiment are denoted by the same reference numerals, and their descriptions will not be repeated.

In the valve body 31, the open flow passage 32 is open to the predetermined surface 31a of the valve body 31 and to an opposite surface 31b on the side opposite the predetermined surface 31a and extends over a predetermined length L1 in the longitudinal direction of the valve body 31 (corresponding to the predetermined direction). The open flow passage 32 extends through the valve body 31 from the predetermined surface 31a to the opposite surface 31b. Notably, there can be employed a structure in which open flow passages 32 are individually formed on the predetermined surface 31a side and the opposite surface 31b side of the valve body 31 and none of the open flow passages 32 extends from the predetermined surface 31a to the opposite surface 31b.

In the first main body 41A, a P1b port, an A1b port, and an R1b port which are open to a first facing surface 45a which faces the predetermined surface 31a are formed at intervals (shorter than the predetermined length L1) in the longitudinal direction of the valve body 31. In the second main body 41B, a P1b port, an A1b port, and an R1b port which are open to a second facing surface 45b which faces the opposite surface 31b are formed at intervals (shorter than the predetermined length L1) in the longitudinal direction of the valve body 31. The P1b port, A1b port, and R1b port of the first main body 41A face the P1b port, A1b port, and R1b port, respectively, of the second main body 41B. The connection flow passages 42, 43, and 44 are connected to the P1b ports, the A1b ports, and the R1b ports, respectively.

A third main body 41C is provided between the first main body 41A and the second main body 41B. The short-side portions 51b of the plate springs 51 are fixed, by means of welding, to opposite ends of the third main body 41C located on opposite sides in the longitudinal direction. The first main body 41A and the second main body 41B are fixed to the third main body 41C using screws 45. The plate springs 51 support the valve body 31 such that a first predetermined gap C1 is formed between the predetermined surface 31a and the first facing surface 45a and a second predetermined gap C2 is formed between the opposite surface 31b and the second facing surface 45b. In the present embodiment, the first predetermined gap C1 and the second predetermined gap C2 are set such that their sizes are equal to each other. Notably, the main bodies 41A, 41B, and 41C, the valve body 31, and the plate springs 51 are assembled by an assembling method similar to the assembling method of the first embodiment.

The same pressurized air is supplied to the P1b port of the first main body 41A and to the P1b port of the second main body 41B which corresponds to the P1b port of the first main body 41A. As a result, the pressure produced by air flowing from the P1b port of the first main body 41A toward the valve body 31 and the pressure produced by air flowing from the P1b port of the second main body 41B toward the valve body 31 are canceled out.

Figure 15:
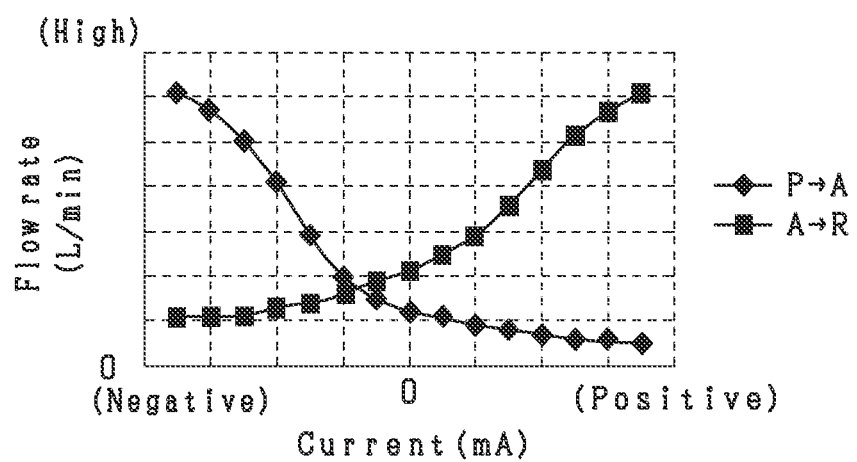
FIG. 15 is a graph showing a relation between current supplied to a coil and flow rate of air in the second embodiment.

FIG. 15 is a graph showing the relation between the current supplied to the coils 72 and the flow rate of air. In FIG. 15, the flow rate due to the leakage of air decreases as compared with FIG. 11. Since the amount of leakage of air decreases, the maximum value of the flow rate can be increased even when air of a lower pressure is used.

FIGS. 16 to 19 are time charts showing the input value (input) and output value (output) of the flow rate.

Figure 16:
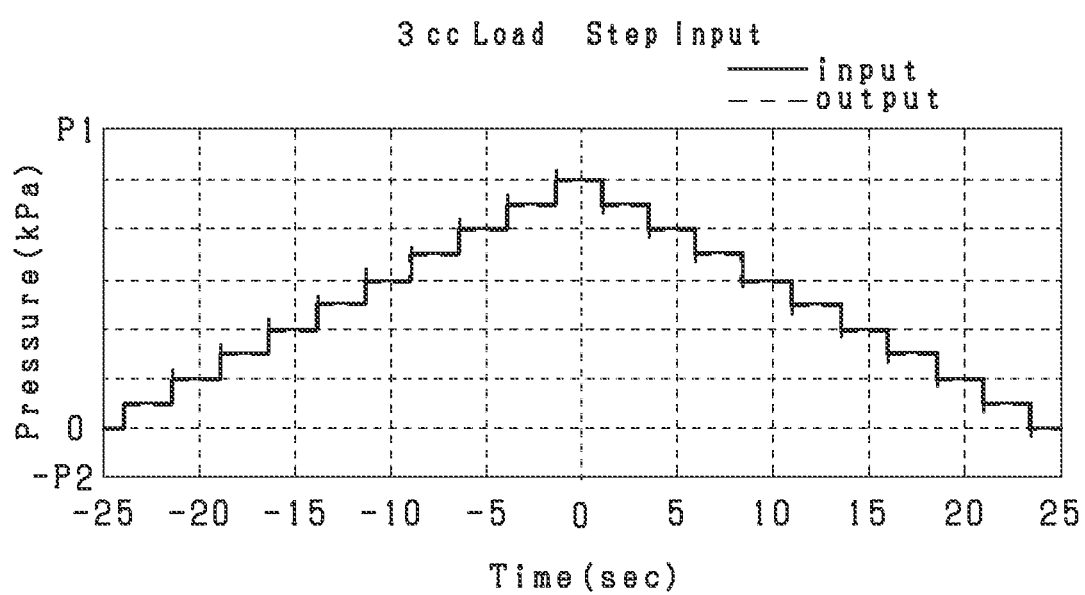
FIG. 16 is a time chart showing input and output values of flow rate of the second embodiment.

FIG. 16 shows the case where the flow path switching valve 10 is used to supply air to and discharge air from a 3 cc load (volume) and a stepwise input value (instruction value) is applied. Although slight overshoot occurs at moments when the input value changes, the output value coincides with the input value.

Figure 17:
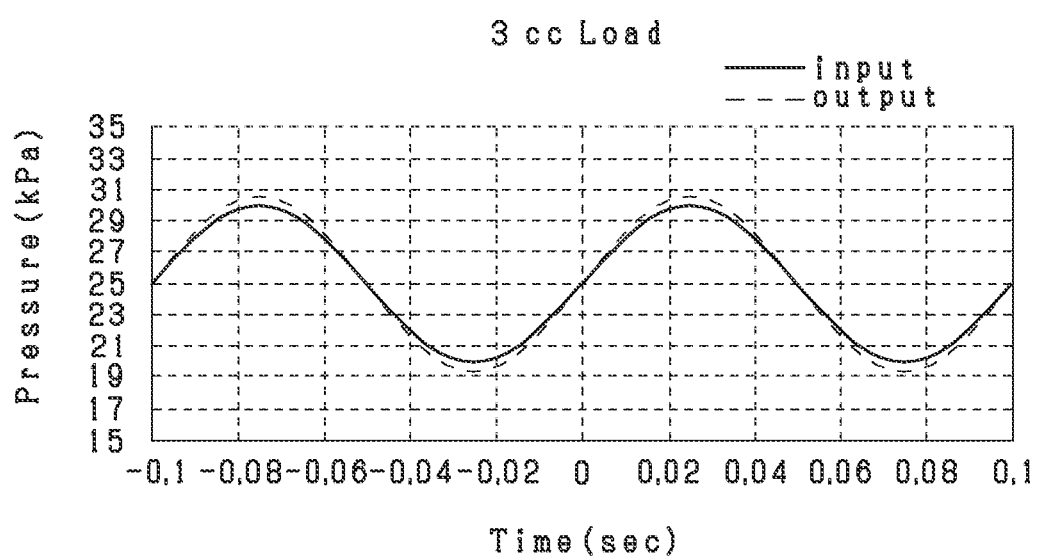
FIG. 17 is another time chart showing the input and output values of flow rate of the second embodiment.

FIG. 17 shows the case where the flow path switching valve 10 is used to supply air to and discharge air from a 3 cc load (volume) and a sinusoidal input value having a frequency of 10 Hz is applied. Although slight overshoot occurs in the vicinity of the local maximum and minimum of the sine wave, the output value coincides with the input value.

Figure 18:
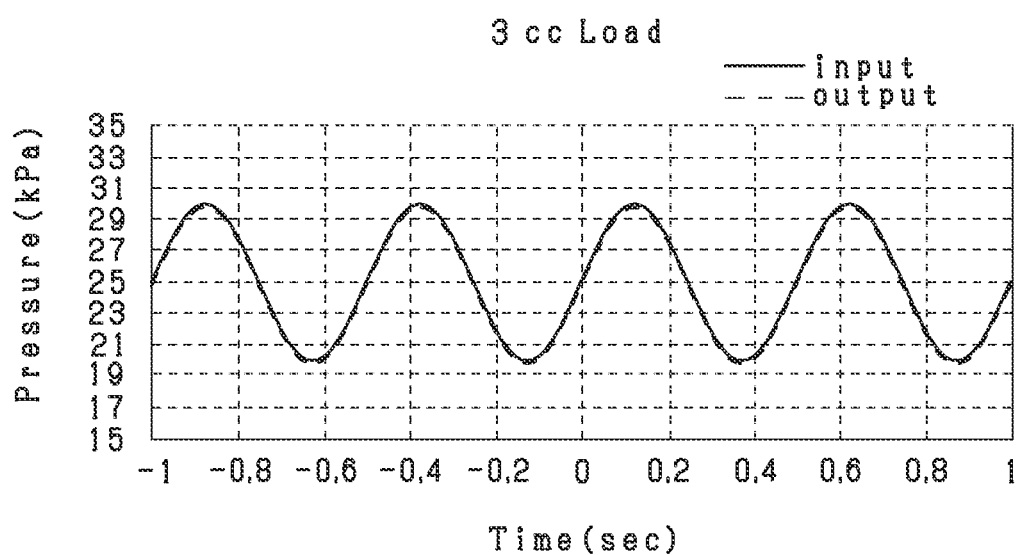
FIG. 18 is another time chart showing the input and output values of flow rate of the second embodiment.

FIG. 18 shows the case where the flow path switching valve 10 is used to supply air to and discharge air from a 3 cc load (volume) and a sinusoidal input value having a frequency of 2 Hz is applied. In this case, the output value accurately coincides with the input value.

Figure 19:
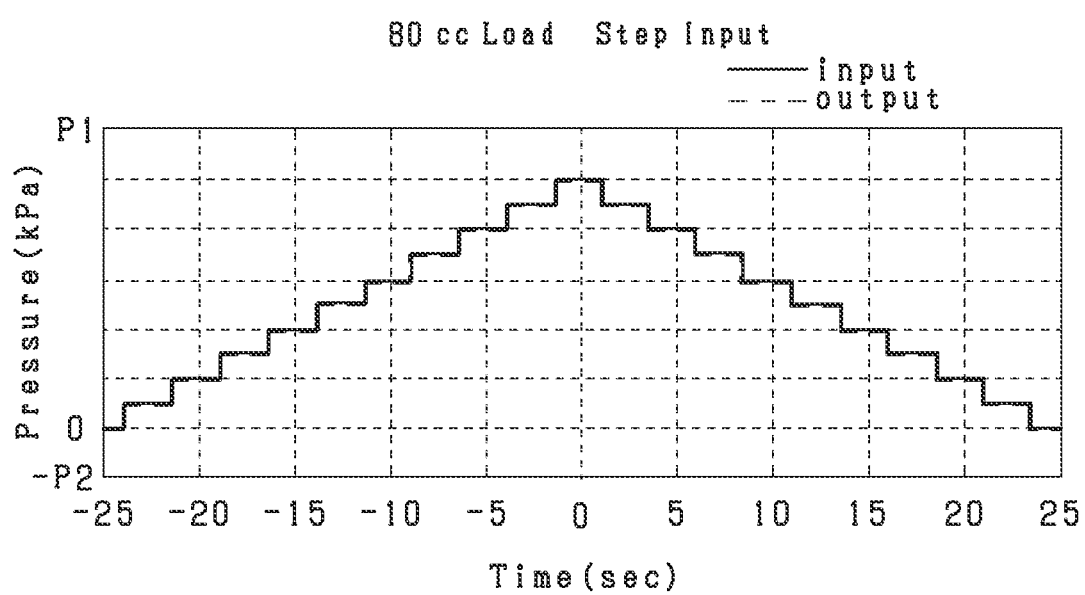
FIG. 19 is another time chart showing the input and output values of flow rate of the second embodiment.

FIG. 19 shows the case where the flow path switching valve 10 is used to supply air to and discharge air from an 80 cc load (volume) and a stepwise input value is applied. In this case, the output value accurately coincides with the input value.

The present embodiment having been described in detail above has the following advantages. Here, only the advantages different from those of the first embodiment will be described.

The first main body 41A and the second main body 41B are provided on opposite sides with the valve body 31 intervening therebetween. The same ports; i.e., the P1b port, the A1b port, and the R1b port, are formed in each of the first main body 41A and the second main body 41B. Therefore, when the same air is caused to flow through the P1b port, the A1b port, and the R1b port of the first main body 41A and flow through the P1b port, the A1b port, and the R1b port of the second main body 41B, which correspond to the P1b port, the A1b port, and the R1b port of the first main body 41A, the pressure produced by air flowing from the P1b port or the A1b port of the first main body 41A toward the valve body 31 and the pressure produced by air flowing from the P1b port or the A1b port of the second main body 41B toward the valve body 31 can be canceled out. Accordingly, it is possible to prevent the valve body 31 from moving in a direction away from the P1b port and the A1b port due to the pressure of air flowing from the P1b port or the A1b port toward the valve body 31.

The pressure produced by air flowing from the ports of the first main body 41A toward the valve body 31 and the pressure produced by air flowing from the ports of the second main body 41B toward the valve body 31 can be canceled out. Therefore, the required rigidity of the plate springs 51 can be decreased, and plate springs thinner than those used in the first embodiment can be employed as the plate springs 51.

The plate springs 51 support the valve body 31 such that a first predetermined gap C1 is formed between the predetermined surface 31a of the valve body 31 and the first facing surface 45a and a second predetermined gap C2 is formed between the opposite surface 31b of the valve body 31 and the second facing surface 45b. Therefore, the valve body 31 can be reciprocated in a state in which the valve body 31 does not rub against the first and second main bodies 41A and 41B.

The above-described first and second embodiments may be modified as follows.

The number and shape of the gap jig(s) used for assembling the main body 41 (41A, 41B, 41C), the valve body 31, and the plate springs 51 can be changed arbitrarily. Namely, the numbers and shapes can be changed arbitrarily so long as the thickness of the gap jig(s) is set on the basis of the size of the predetermined gap C1 between the predetermined surface 31a of the valve body 31 and the facing surface 41a (45a) of the main body 41.

The size of the predetermined gap C1 is not limited to about 5 μm, and may be 1 to 5 μm, 6 to 10 μm, or 10 to 20 μm.

A structure in which the movable rod 81 penetrates halfway the valve body 31 or a structure in which the movable rod 81 is fixed to an end portion 36 of the valve body 31 on one side thereof can be employed.

In the actuator 70, the position of the movable rod 81 (the movable element 76) in a state in which the plate springs 51 support the valve body 31 in the natural state may be set to a position other than the neutral position at which the electromagnetic force for reciprocating the movable rod 81 in the longitudinal direction of the valve body 31 is not applied.

A structure in which the plate springs 51 attached to the opposite end portions 36 of the valve body 31 differ in elastic force from each other may be employed.

A structure in which each plate spring 51 is fixed to the main body 41 such that its main faces having the largest area extend obliquely (not perpendicularly) to the longitudinal direction of the valve body 31 may be employed.

A motor, a piezo element, a thermal actuator, or the like may be employed as the actuator 70. However, the actuator 70 desirably has a structure which generates no frictional force when it drives the valve body 31. Notably, even in the case where frictional force is generated in the actuator 70 upon drive of the valve body 31, the responsiveness of the flow path switching valve 10 in switching the flow path can be improved, as compared with the conventional flow path switching valve, by reciprocating the valve body 31 in a state in which the valve body 31 and the main body 41 do not rub against each other.

The number of the ports formed in the main body 41 is not limited to three and may be two or four or more.

The fluid whose flow passage is switched by the flow path switching valve 10 is not limited to air, and may be liquid or gas other than air.

Third Embodiment

In the present embodiment, the above-described movable rod 81 is omitted, and the valve body 31 and the movable element 76 are integrated. In the below, a portion of the third embodiment different from that of the second embodiment will be mainly described. Notably, members which correspond to those of the first and second embodiments are denoted by the same reference numerals, and their descriptions will not be repeated.

Figure 20:
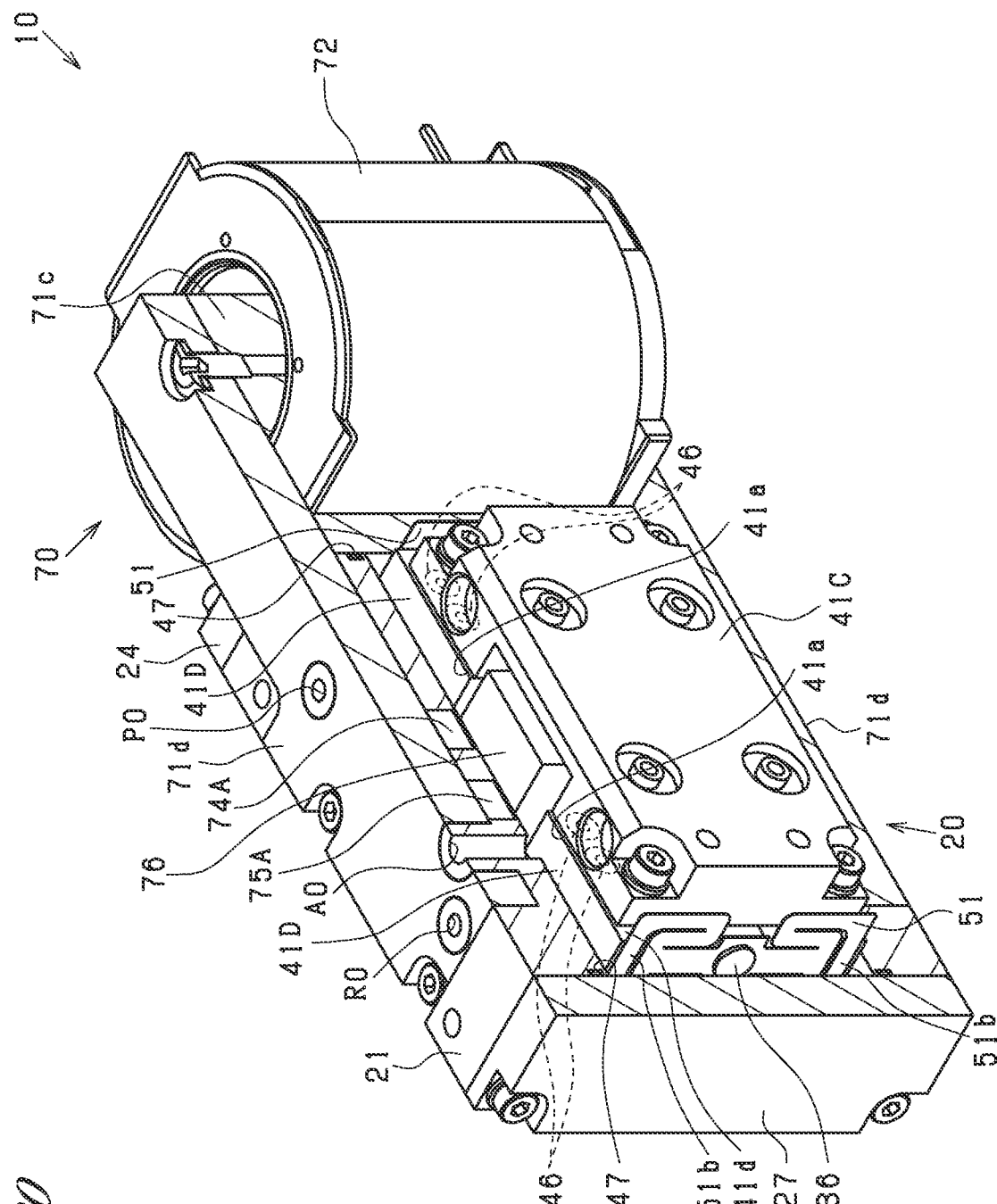
FIG. 20 is a perspective sectional view showing a flow path switching valve of a third embodiment.
Figure 21:
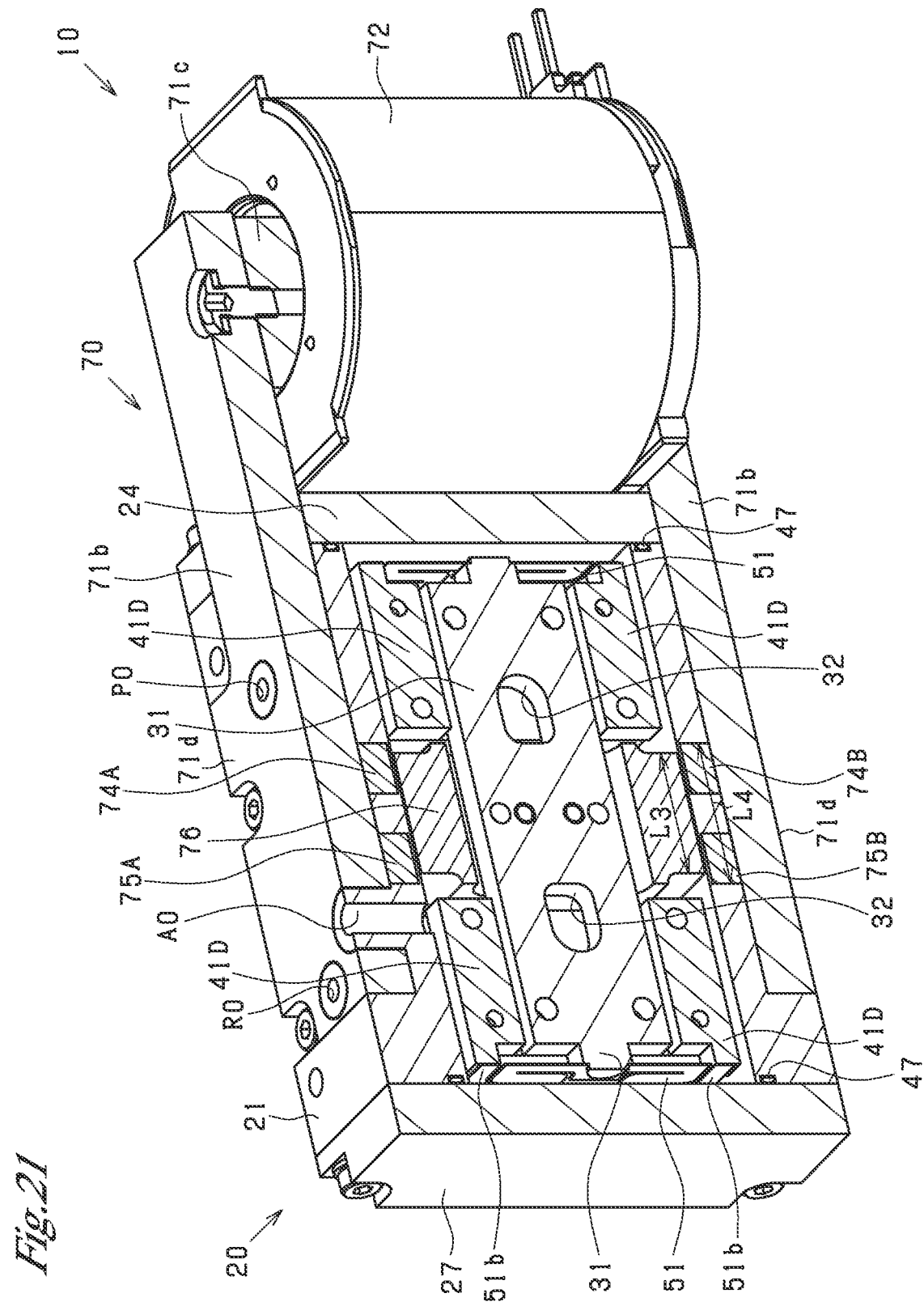
FIG. 21 is a perspective sectional view showing the flow path switching valve of the third embodiment.
Figure 22:
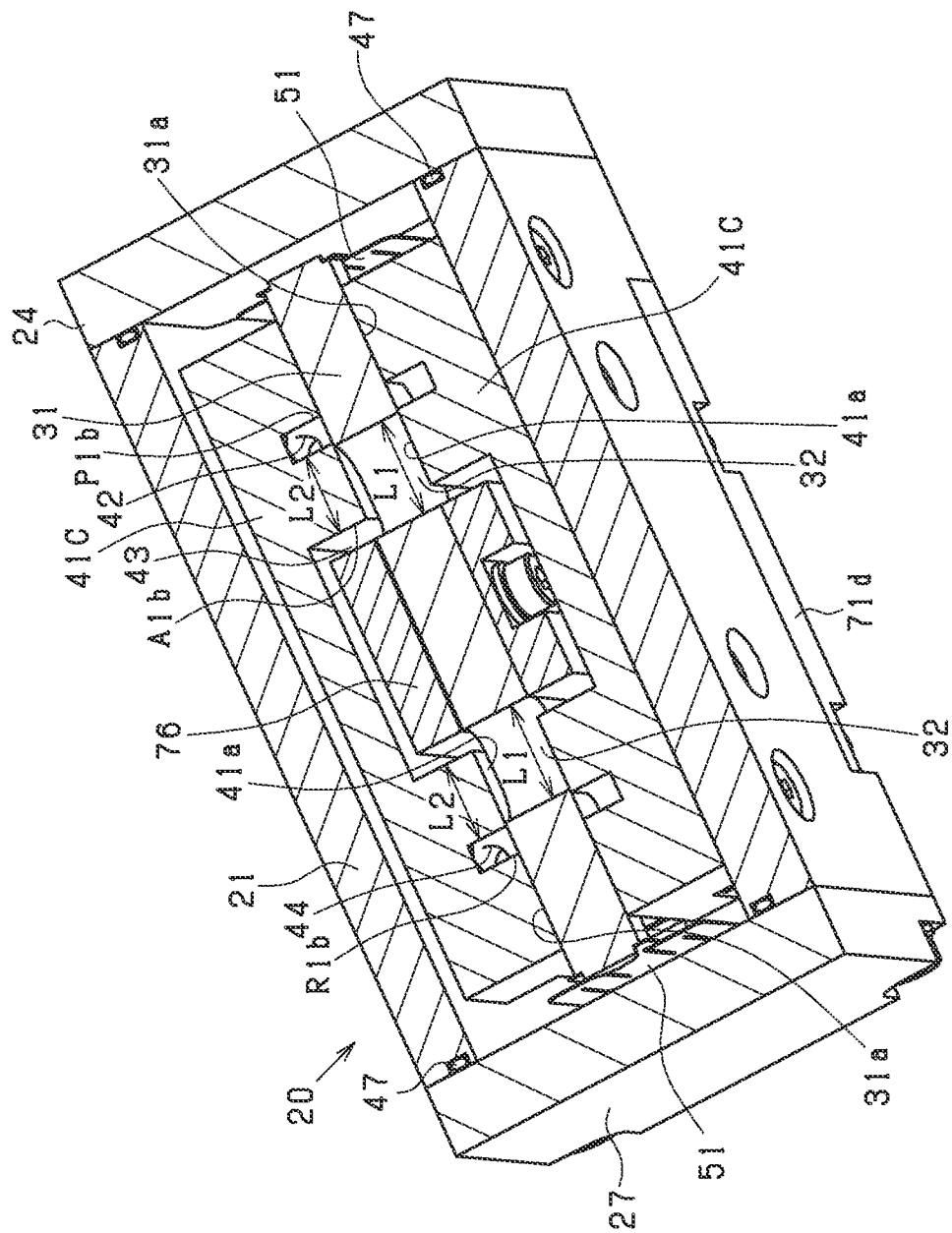
FIG. 22 is a perspective sectional view showing a valve mechanism of the third embodiment.

As shown in FIGS. 20 to 22, the valve mechanism 20 includes a housing 21, the valve body 31, third main bodies 41C, fourth main bodies 41D, plate springs 51, a cover 27, etc. The housing 21, the valve body 31, the third main bodies 41C, the fourth main bodies 41D, the plate springs 51, and the cover 27 are formed of a non-magnetic material.

The housing 21 has a rectangular tubular shape. The housing 21 has P0 ports (pressurized air ports) to which pressurized air (corresponding to the fluid) is supplied, an A0 port (output port) from which air is supplied to a load and to which air is discharged from the load, and R0 ports (discharge port) from which air is discharged. The P0 ports, the A0 port, and the R0 ports are formed of a non-magnetic material. Pressurization flow passages, an output flow passage, and air discharge flow passages are connected to the P0 ports, the A0 port, and the R0 ports, respectively. The pressurization flow passages and the air discharge flow passages are connected to the third main bodies 41C. The output flow passage has an opening on the inner wall surface of the housing 21.

The valve body 31, the main bodies 41C and 41D, the plate springs 51, the magnets 74A, 74B, 75A, and 75B, etc. are disposed inside the housing 21. Each of the main bodies 41C and 41D has the shape of a rectangular parallelepiped (the shape of a flat plate). The third main bodies 41C are fixed to the housing 21. The fourth main bodies 41D are fixed to the third main bodies 41C. The valve body 31 has the shape of a rectangular parallelepiped (the shape of a flat plate).

The valve body 31 is disposed between the fourth main bodies 41D disposed in parallel. A gap is formed between each of the fourth main bodies 41D and the valve body 31. Namely, the valve body 31 does not contact with the fourth main bodies 41D.

The valve body 31 is fixed to the fourth main bodies 41D through the plate springs 51. Two short-side portions 51b of each plate spring 51 are fixed to the corresponding fourth main bodies 41D. Each plate spring 51 is fixed to the corresponding fourth main bodies 41D such that its main faces (vertical surfaces in FIGS. 20 and 21) having the largest area extend perpendicularly to the longitudinal direction of the valve body 31. By virtue of such a configuration, the valve body 31 (corresponding to the movable member) is supported by the pair of plate springs 51 to be movable in the longitudinal direction of the valve body 31 (corresponding to the predetermined direction).

Predetermined surfaces 31a of the valve body 31 are flush with corresponding first surfaces 41d of the fourth main bodies 41D. As shown in FIG. 22, facing surfaces 41a of the third main bodies 41C face the predetermined surfaces 31a of the valve body 31. The first surfaces 41d of the fourth main bodies 41D face the facing surfaces 41a of the third main bodies 41C. The third main bodies 41C and the fourth main bodies 41D are fixed together in a state in which two shims (spacers) 46 having a predetermined thickness and arranged side by side are inserted between each of the first surfaces 41d of the fourth main bodies 41D and corresponding one of the facing surfaces 41a of the third main bodies 41C. The thickness of the shims 46 is about 10 μm. Namely, gaps (predetermined gaps) corresponding to the thickness of the shims 46 are formed between the predetermined surfaces 31a of the valve body 31 and the facing surfaces 41a of the third main bodies 41C. Therefore, the valve body 31 has no portion which is in sliding engagement with other members. Notably, the number of the shims 46 is not limited to two, and may be one or three or more.

As shown in FIG. 22, the valve body 31 has two open flow passages 32 which are open to the predetermined surfaces 31a over a predetermined length L1 as measured in the longitudinal direction of the valve body 31 (the predetermined direction). The open flow passages 32 penetrate the valve body 31 in a direction orthogonal to the predetermined surfaces 31a and each have the shape of an oval hole whose length along the major axis is the predetermined length L1. Notably, there can be employed a configuration in which the open flow passages 32 are recesses formed on the predetermined surfaces 31a of the valve body 31 and do not penetrate the valve body 31.

Each of the third main bodies 41C has a P1*b* port, an A1*b* port, and an R1*b* port (corresponding to the plurality of ports) which are open to the facing surface 41*a*. The P1*b* port, the A1*b* port, and the R1*b* port are formed at intervals L2 in the longitudinal direction of the valve body 31. The intervals L2 are shorter than the predetermined length L1. Each of the third main bodies 41C has connection flow passages 42, 43, and 44 which are connected to the P1*b* port, the A1*b* port, and the R1*b* port, respectively. The connection flow passages 42, 43, and 44 are connected to the above-described pressurization flow passage, output flow passage, and air discharge flow passage, respectively. Notably, the connection flow passage 43 is connected to the output flow passage through a space inside the housing 21. The space inside the housing 21 is sealed by seal members 47.

The plate springs 51 apply an elastic force to the valve body 31 in accordance with the amount of movement of the valve body 31 in the longitudinal direction of the valve body 31 (a direction orthogonal to the main faces of the plate springs 51). Specifically, the plate springs 51 apply to the valve body 31 an elastic force which is proportional to the amount of movement of the valve body 31 in the longitudinal direction of the valve body 31; i.e., the amounts of deformation of the plate springs 51.

Next, the structure of the actuator 70 will be described with reference to FIGS. 20 and 21. The actuator 70 includes a core 71 (71*c*, 71*d*), a coil 72, the magnets 74A, 74B, 75A, and 75B, etc.

The core 71 is formed of a paramagnetic material and has a "U" like shape. The coil 72 is wound around a portion 71*c* of the core 71, which portion corresponds the bottom of the letter U. A pair of straight portions 71*d* of the core 71, which portions correspond to the pair of straight portions of the letter U, are parallel to each other.

The magnets 74A and 75A and the magnets 74B and 75B are attached to the pair of straight portions 71*d*. The magnets 74A and 75A are permanent magnets formed of a ferromagnetic material. Each of the magnets 74A to 75B has the shape of a rectangular parallelepiped. The magnets 74A and 75B are attached to the straight portions 71*d* of the core 71 such that their S poles are located on the side toward the straight portions 71*d* of the core 71 and their N poles are located on the side toward the valve body 31 (the movable element 76). The magnets 74B and 75A are attached to the straight portions 71*d* of the core 71 such that their N poles are located on the side toward the straight portions 71*d* of the core 71 and their S poles are located on the side toward the valve body 31 (the movable element 76). The N pole of the magnet 74A and the S pole of the magnet 74B face each other, and the S pole of the magnet 75A and the N pole of the magnet 75B face each other. The surfaces of the magnets 74A and 74B which face each other are parallel to each other, and the surfaces of the magnets 75A and 75B which face each other are parallel to each other. The magnets 74A and 75A are disposed at a predetermined interval in the longitudinal direction of the valve body 31 (hereinafter referred to as the "predetermined direction"), and the magnets 74B and 75B are disposed at the predetermined interval in the predetermined direction.

The movable element 76 is disposed between the magnets 74A and 75A and the magnets 74B and 75B with portions of the housing 21 intervening therebetween. The portions of the housing 21 intervening between the magnet 74A and 74B and the portions of the housing 21 intervening between the magnets 75A and 75B are formed to be thin so that magnetic fluxes easily pass through these portions. The movable element 76 is formed of a paramagnetic material and has a rectangular tubular shape. The width L3 of the movable element 76 as measured in the predetermined direction is smaller than the spacing L4 between the end surface of the magnet 74B (74A) on the connection member 24 side and the end surface of the magnet 75B (75A) on the cover 27 side. The valve body 31 extends through a hollow space of the movable element 76. The movable element 76 is fixed to the center of the valve body 31 in the predetermined direction. Namely, the movable element 76 is fixed to a portion of the valve body 31, which portion is located between the pair of plate springs 51. The movable element 76 does not contact with members other than the valve body 31.

In the predetermined direction, the movable element 76 is located at the center position (neutral position) between the magnet 74A (74B) and the magnet 75A (75B) due to magnetic forces of the magnets 74A, 74B, 75A, and 75B. In this state, the movable element 76 is fixed to the valve body 31 supported by the pair of plate springs 51 in the natural state. Namely, in the actuator 70, the position of the movable element 76 in a state in which the plate springs 51 support the valve body 31 in the natural state is set to the neutral position at which the electromagnetic force for reciprocating the valve body 31 (the movable element 76) in the predetermined direction is not applied. The actuator 70 drives the valve body 31 in the predetermined direction in a non-contact state by means of the electromagnetic force applied to the movable element 76 in a region between the pair of plate springs 51 in the predetermined direction.

Next, the principle of reciprocating the valve body 31 in the longitudinal direction of the valve body 31 (the predetermined direction) by the actuator 70 will be described with reference to FIGS. 23 to 25.

Figure 23:
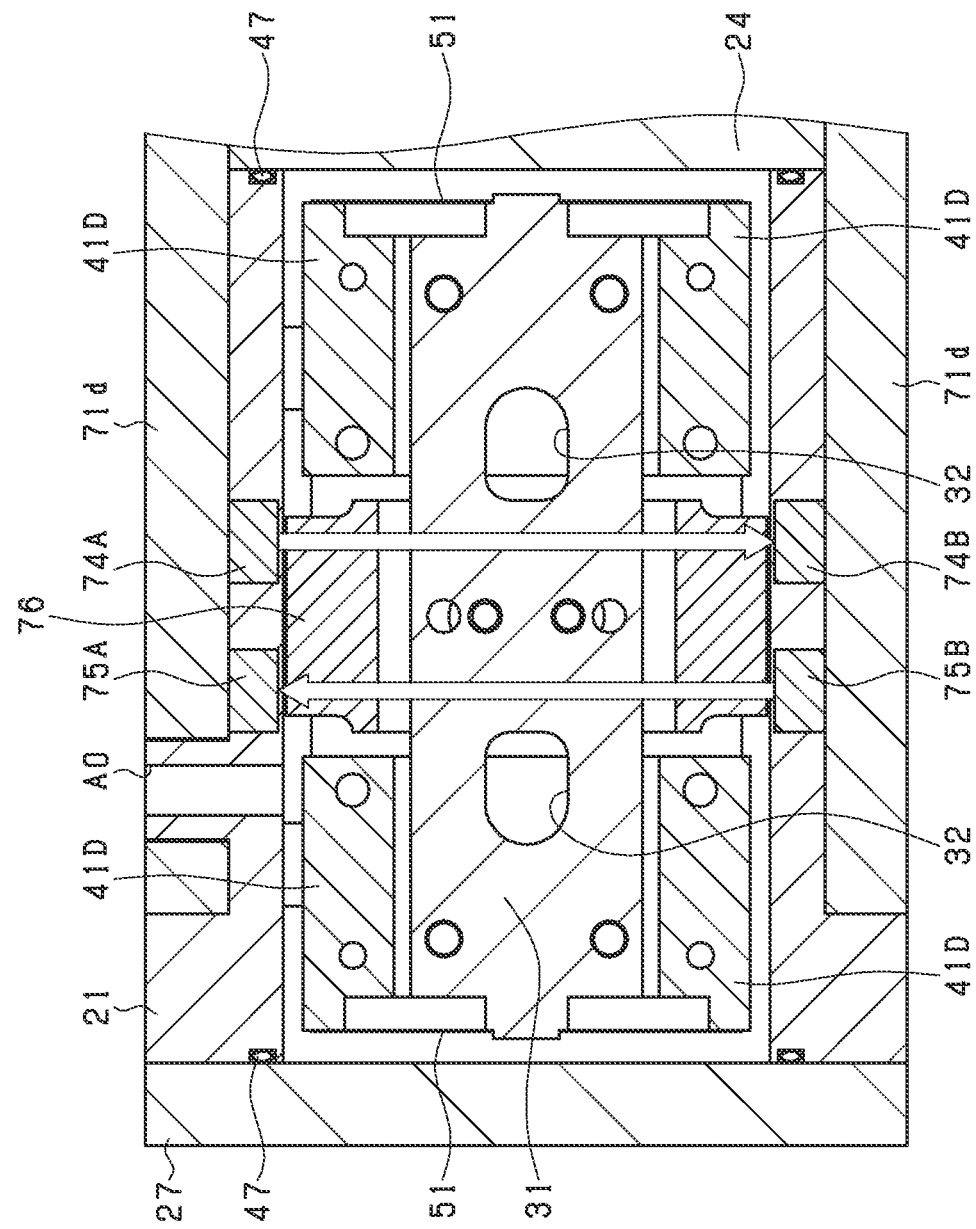
FIG. 23 is a front sectional view showing a state in which the valve mechanism is unexcited in the third embodiment.

In an unexcited state in which no current is supplied to the coil 72 of the actuator 70, as shown in FIG. 23, a magnetic field extending from the N pole of the magnet 74A toward the S pole of the magnet 74B and a magnetic field extending from the N pole of the magnet 75B toward the S pole of the magnet 75A are generated. In this state, the movable element 76 is at rest in the neutral position in the predetermined direction because the generated magnetic fields are in balance. In this state, since the pair of plate springs 51 are in the natural state, no force is applied from the pair of plate springs 51 to the valve body 31. Also, in this state, the P1*b* port and the R1*b* port of each third main body 41C are closed by the valve body 31 as shown in FIG. 22.

Figure 24:
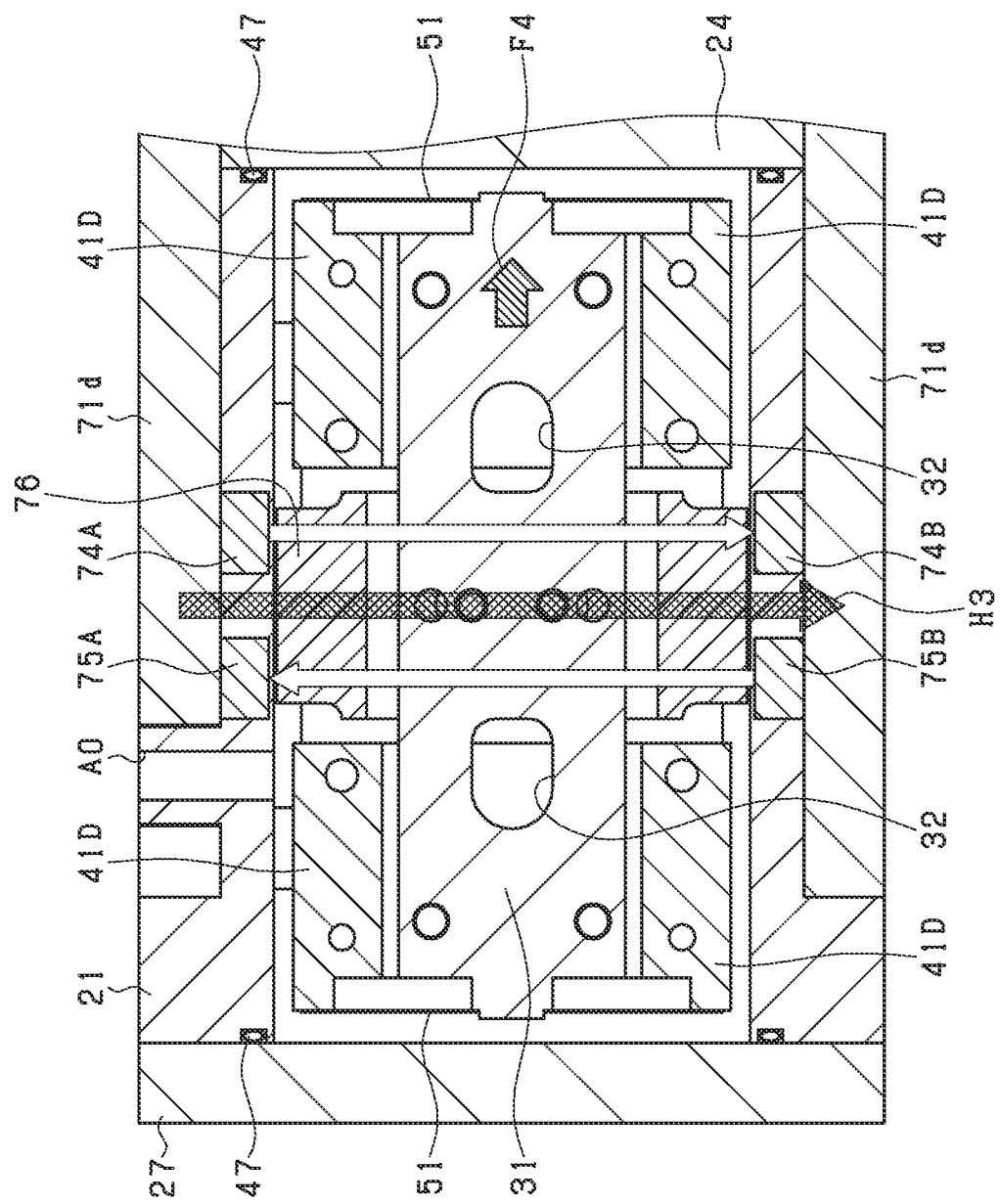
FIG. 24 is a front sectional view showing a state in which the valve mechanism is excited in a positive direction in the third embodiment.

In a positive direction excited state in which a current of a positive direction is supplied to the coil 72 of the actuator 70, a coil magnetic field extending from the upper straight portion 71*d* of the core 71 toward the lower straight portion 71*d* of the core 71 is generated as indicated by an arrow H3 in FIG. 24. Therefore, the magnetic field extending from the N pole of the magnet 74A toward the S pole of the magnet 74B and the coil magnetic field strengthen each other, and the magnetic field extending from the N pole of the magnet 75B toward the S pole of the magnet 75A and the coil magnetic field weaken each other. As a result, the movable element 76 receives a magnetic attraction force toward the connection member 24. Thus, as indicated by an arrow F4, the valve body 31 moves, together with the movable element 76, in the direction of the arrow F4. At that time, by means of electromagnetic force, the actuator 70 drives the valve body 31 in a non-contact state, whereby the valve body 31 is driven without coming into contact with the main bodies 41C and 41D. When the valve body 31 is driven, the pair of plate springs 51 apply to the valve body 31 a reaction force which is proportional to the amount of movement of the valve body 31. In FIG. 22, when the valve body 31 is moved toward the connection member 24, the A1*b* port and the P1*b* port of each third main body 41C are connected through the open flow passage 32 of the valve body 31. Namely, the flow passage of the flow path switching valve 10 is switched.

The same pressurized air is supplied to the P1*b* ports of the respective third main bodies 41C. As a result, the pressure produced by the air flowing toward the valve body 31 from the P1*b* of one third main body 41C and the pressure produced by the air flowing toward the valve body 31 from the P1*b* port of the other third main body 41C are canceled out.

Figure 25:
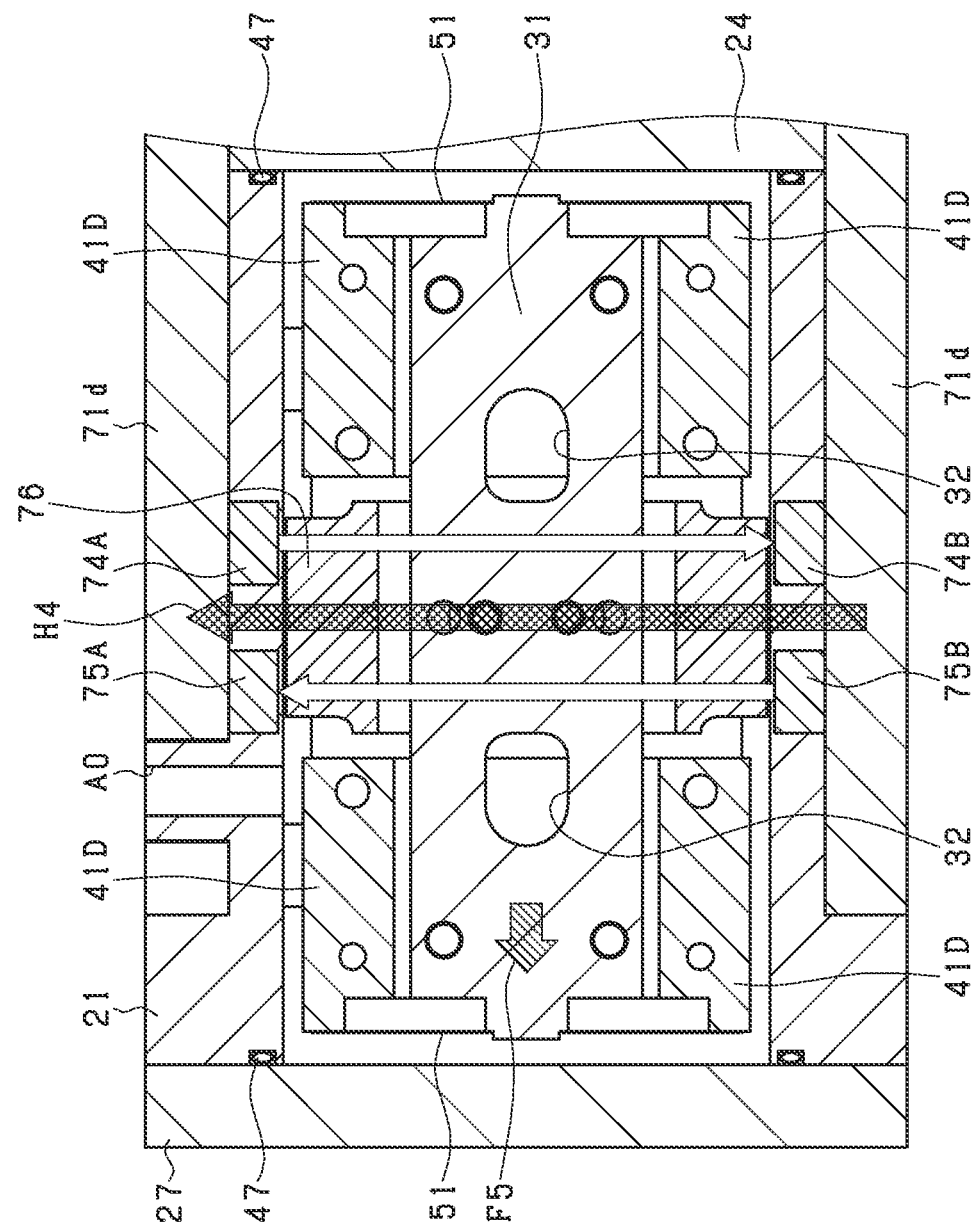
FIG. 25 is a front sectional view showing a state in which the valve mechanism is excited in a negative direction in the third embodiment.

In a negative direction excited state in which a current of a negative direction is supplied to the coil 72 of the actuator 70, a coil magnetic field extending from the lower straight portion 71*d* of the core 71 toward the upper straight portion 71*d* of the core 71 is generated as indicated by an arrow H4 in FIG. 25. Therefore, the magnetic field extending from the N pole of the magnet 74A toward the S pole of the magnet 74B and the coil magnetic field weaken each other, and the magnetic field extending from the N pole of the magnet 75B toward the S pole of the magnet 75A and the coil magnetic field strengthen each other. As a result, the movable element 76 receives a magnetic attraction force toward the cover 27. Thus, as indicated by an arrow F5, the valve body 31 moves, together with the movable element 76, in the direction of the arrow F5. At that time, by means of electromagnetic force, the actuator 70 drives the valve body 31 in a non-contact state, whereby the valve body 31 is driven without coming into contact with the main bodies 41C and 41D. When the valve body 31 is driven, the pair of plate springs 51 apply to the valve body 31 a reaction force which is proportional to the amount of movement of the valve body 31. In FIG. 22, when the valve body 31 is moved toward the cover 27, the A1*b* port and the R1*b* port of each third main body 41C are connected through the open flow passage 32 of the valve body 31. Namely, the flow passage of the flow path switching valve 10 is switched.

The present embodiment having been described in detail above has the following advantages.

The pair of plate springs 51 apply elastic force to the valve body 31 in the predetermined direction in accordance with the amount of deformation of the plate springs 51. Since the valve body 31 is supported by the pair of plate springs 51 to be movable in the predetermined direction, the valve body 31 can be movably supported without involving sliding movement. The valve body 31 is driven in the predetermined direction in a non-contact state by means of electromagnetic force applied by the actuator 70. As a result, no frictional force is produced during the drive of the valve body 31, whereby the responsiveness in driving the valve body 31 can be improved. Further, since the valve body 31 is driven without involving sliding movement, the valve body 31 is free of wear, and can be used semi-permanently unlike the case of an ordinary valve body involving sliding movement.

The valve body 31 is supported by the pair of plate springs 51, and electromagnetic force is applied to a region between the pair of plate springs 51 in the predetermined direction. Therefore, it is possible to prevent swaying of the valve body 31 when the valve body 31 is driven.

Electromagnetic force is applied to the movable element 76 fixed to the valve body 31. Therefore, the movable element 76 to which electromagnetic force is applied and the valve body 31 can be formed as separate members, whereby the degree of freedom in designing the valve body 31 can be increased.

Fluid can be caused to flow, through the connection flow passages formed in the third main bodies 41C, to or from the ports connected to the connection flow passages. The valve body 31 has the open flow passages 32 which are open to the predetermined surfaces 31*a* over the predetermined length L1 in the predetermined direction. Each of the third main bodies 41C has a plurality of ports which are formed at the interval L2 shorter than the predetermined length L1 in the predetermined direction such that the ports are open to the facing surfaces 41*a* of the third main bodies 41C which face the predetermined surfaces 31*a* of the valve body 31. Therefore, by driving the valve body 31 in the predetermined direction by the actuator 70, the state of connection of the plurality of ports through the open flow passages 32 of the valve body 31; i.e., the flow passage for the fluid, can be switched.

The predetermined surfaces 31*a* of the valve body 31 are flush with the corresponding first surfaces 41*d* of the fourth main bodies 41D, and the third main bodies 41C and the fourth main bodies 41D are fixed together in a state in which the shims 46 each having a predetermined thickness are disposed between the facing surfaces 41*a* of the third main bodies 41C and the first surfaces 41*d* of the fourth main bodies 41D. Therefore, gaps corresponding to the thickness of the shims 46 can be easily formed between the predetermined surfaces 31*a* of the valve body 31 and the facing surfaces 41*a* of the third main bodies 41C.

In the actuator 70, the position of the valve body 31 (the movable element 76) in a state in which the plate springs 51 support the valve body 31 in the natural state is set to the neutral position at which the electromagnetic force for reciprocating the valve body 31 (the movable element 76) in the predetermined direction is not applied. By virtue of this configuration, in a state in which the plate springs 51 support the valve body 31 in the natural state and no electromagnetic force is applied to the movable element 76 by the actuator 70, the valve body 31 can be maintained at the neutral position in the predetermined direction. Therefore, by controlling the electromagnetic force applied to the movable element 76 while using the neutral position as a reference, the valve body 31 can be easily reciprocated with excellent reproducibility. Further, the flow rate of the fluid in a state in which no electromagnetic force is applied to the movable element 76 by the actuator 70 can be stabilized at a constant level.

The third main bodies 41C are provided on the opposite sides of the valve body 31. Each of the third main bodies 41C has the same ports; i.e., the P1*b* port, the A1*b* port, and the R1*b* port. Therefore, by causing the same air to flow through the P1*b*, A1*b*, and R1*b* ports of one third main body 41C and flow through the P1*b*, A1*b*, and R1*b* ports of the other third main body 41C, it is possible to cancel out the pressure generated by the air flowing toward the valve body 31 from the P1*b* and A1*b* ports of the one third main body 41C and the pressure generated by the air flowing toward the valve body 31 from the P1*b* and A1*b* ports of the other third main body 41C. Accordingly, it is possible to prevent the valve body 31 from moving in a direction away from the P1*b* and A1*b* ports due to the pressure of air flowing toward the valve body 31 from the P1*b* and A1*b* ports. Also, the required rigidity of the plate spring 51 can be decreased, and thinner plate springs 51 can be employed.

Notably, the above-described third embodiment may be modified as follows.

There can be employed a structure in which the pair of plate springs 51 support portions of the valve body 31 other than the opposite ends 36; for example, portions of the valve body 31 slightly offset from the opposite ends toward the center of the valve body 31.

The thickness of the shims 46 is not limited to about 10 µm, and may be 5 to 10 µm, 10 to 15 µm, or 15 to 20 µm.

Figure 26:
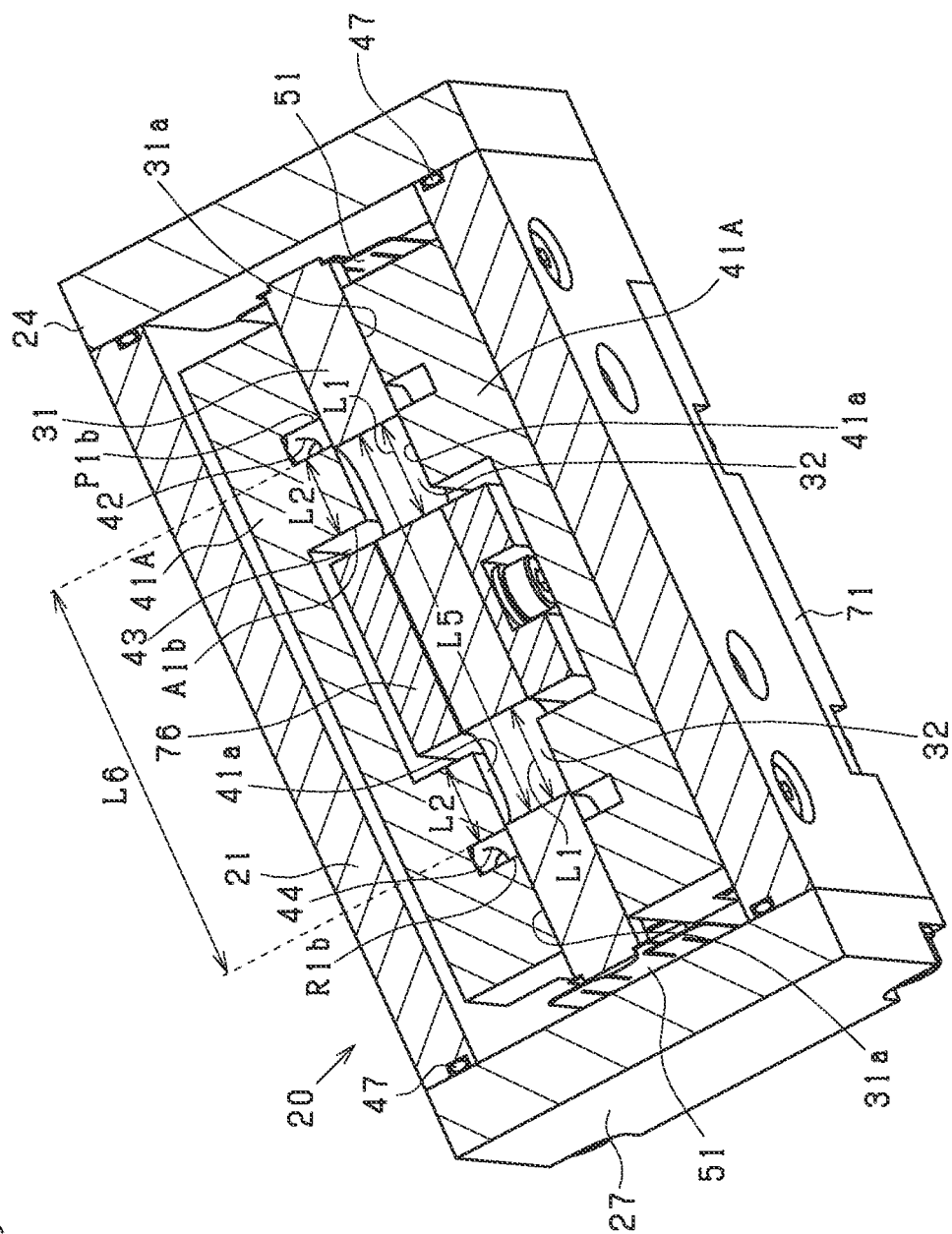
FIG. 26 is a perspective sectional view showing a modification of the valve mechanism of the third embodiment.
Figure 27:
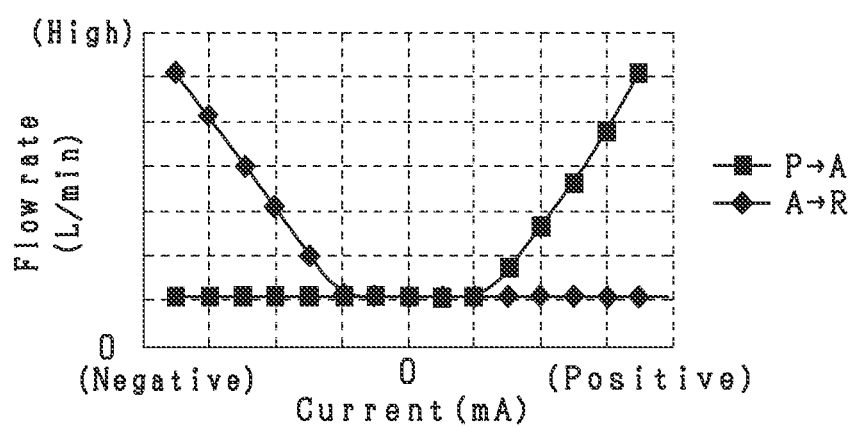
FIG. 27 is a graph showing an example of the relation between drive current and flow rate in the third embodiment.

FIG. 26 shows the spacing L5 between the outer ends (ends located on the outer side in the predetermined direction) of the two open flow passages 32 and the spacing L6 between the P1b port and the R1b port. The relation between the spacing L5 and the spacing L6 can be changed as follows:

(1) L6≥L5. In this case, as shown in FIG. 27, the flow path switching valve 10 has a dead zone near the point where the current supplied to the actuator of the valve is 0 mA, and can stabilize the start of flow of the fluid.

Figure 28:
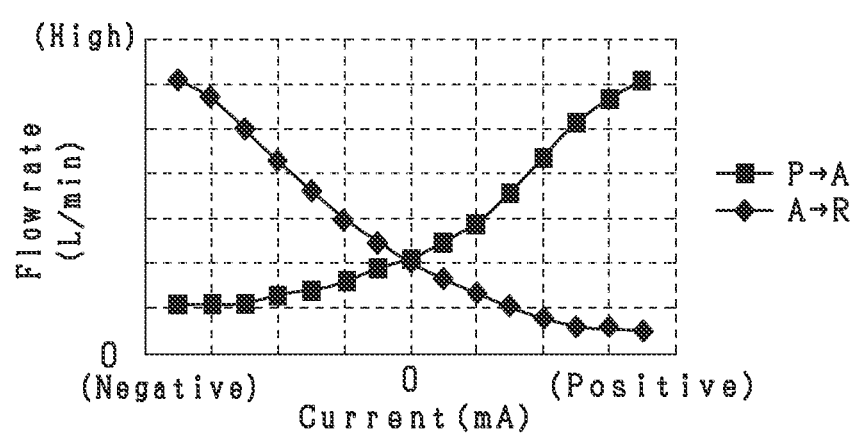
FIG. 28 is a graph showing a modified example of the relation between drive current and flow rate in the third embodiment.

(2) L6<L5. In this case, as shown in FIG. 28, the flow path switching valve 10 provides a constant bleeding flow rate in a zone near the point where the current supplied to the actuator of the valve is 0 mA, and can enhance the responsiveness in changing the flow rate of the fluid.

Figure 29:
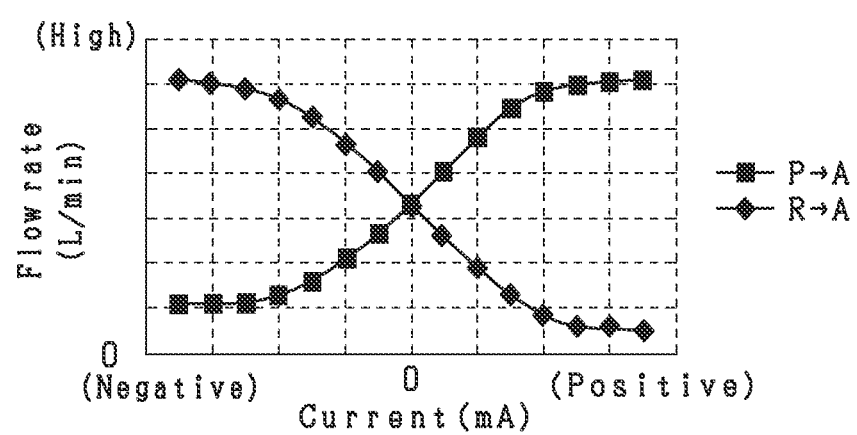
FIG. 29 is a graph showing another modified example of the relation between drive current and flow rate in the third embodiment.

(3) L6<<L5. In this case, as shown in FIG. 29, the flow path switching valve 10 can be used as a mixing valve for mixing a fluid flowing from the port P to the port A and a fluid flowing from the port R to the port A.

The movable element 76 and the valve body 31 may be formed as a single member through use of a paramagnetic material. In this case, the movable element itself serves as the valve body 31 (the movable member), and the open flow passages 32 are formed on the movable element.

The present disclosure has been described on the basis of embodiments; however, it is understood that the present disclosure is not limited to the embodiments and structures. The present disclosure encompasses various modified embodiments and modifications within the range of equivalents. In addition, various combinations and forms and other combinations and forms including one element only, more elements, or less elements fall within the scope of the present disclosure and the scope of the idea.

What is claimed is:

1. A flow path switching valve for switching a flow path for a fluid, the flow path switching valve comprising:
   a valve body in a shape of a rectangular parallelepiped which has a predetermined surface and an opposite surface located opposite the predetermined surface, the valve body including an open flow passage having an opening on the predetermined surface of the valve body, the opening having a predetermined length in a predetermined direction, the valve body having a pair of opposite ends along the predetermined direction;
   a main body including:
      a plurality of ports arranged in the predetermined direction at intervals shorter than the predetermined length, the plurality of ports having a respective opening on a facing surface of the main body facing the predetermined surface; and
      a plurality of connection flow passages each connected to respective one of the plurality of ports;
   a pair of plate springs attached to the opposite ends of the valve body, respectively, so as to support the valve body such that a predetermined gap is formed between the predetermined surface and the facing surface, the plate springs applying elastic force to the valve body in accordance with an amount of movement of the valve body in the predetermined direction;
   an actuator for reciprocating the valve body in the predetermined direction in a non-contact manner; and
   a movable element disposed in a location between the plate springs and fixed to the valve body,
   wherein the actuator applies an electromagnetic field across the valve body in a region between the pair of plate springs so as to drive the movable element in the predetermined direction, thereby reciprocating the valve body in a non-contact manner.

2. The flow path switching valve according to claim 1, wherein the open flow passage is formed through the valve body, the open flow passage having a second opening on the opposite surface, the second opening having a predetermined length in the predetermined direction;
   wherein the flow path switching valve further comprises:
      a second main body including:
         a plurality of second ports arranged in the predetermined direction at intervals shorter than the predetermined length, each second port having a respective opening on a second facing surface of the second main body facing the opposite surface; and
         a plurality of second connection flow passages each connected to respective one of the plurality of second ports; and
      wherein the pair of plate springs are attached to the opposite ends of the valve body such that a second predetermined gap is also formed between the opposite surface and the second facing surface.

3. The flow path switching valve according to claim 1, wherein each plate spring is attached to the main body such that main faces of the plate spring which have a largest area extend perpendicularly to the predetermined direction.

4. The flow path switching valve according to claim 2, wherein each plate spring is attached to the main body such that main faces of the plate spring which have a largest area extend perpendicularly to the predetermined direction.

5. The flow path switching valve according to claim 4, wherein
   a movable element is fixed to a portion of the valve body, which portion is located between the plate springs; and
   the actuator reciprocates the valve body in the predetermined direction in a non-contact state by an electromagnetic force applied to the movable element in a region between the plate springs in the predetermined direction.

6. The flow path switching valve according to claim 5, wherein, in the actuator, a position of the valve body in a state in which the plate springs support the valve body in their natural state is set to a neutral position at which the electromagnetic force for reciprocating the valve body in the predetermined direction is not applied.

7. The flow path switching valve according to claim 1, wherein
   each of the predetermined surface and the facing surface is finished to have a predetermined degree of flatness; and
   the plate springs support the valve body such that the predetermined surface and the facing surface have a predetermined degree of parallelism therebetween.

8. The flow path switching valve according to claim 2, wherein
   each of the predetermined surface and the facing surface is finished to have a predetermined degree of flatness;
   each of the opposite surface and the second facing surface is finished to have a predetermined degree of flatness; and the pair of plate springs support the valve body such that the predetermined surface and the facing surface have a predetermined degree of parallelism therebetween, and that the opposite surface and the second facing surface have a predetermined degree of parallelism therebetween.

9. A method for manufacturing the flow path switching valve including (a) a valve body in a shape of a rectangular parallelepiped which has a predetermined surface and an opposite surface located opposite the predetermined surface, the valve body including an open flow passage having an opening on the predetermined surface of the valve body, the opening having a predetermined length in a predetermined direction, the valve body having a pair of opposite ends along the predetermined direction, (b) a main body having a plurality of ports arranged in the predetermined direction at intervals shorter than the predetermined length, the plurality of ports having a respective opening on a facing surface of the main body facing the predetermined surface, and a plurality of connection flow passages each connected to respective one of the plurality of ports, (c) a pair of plate springs attached to the opposite ends of the valve body, respectively, so as to support the valve body such that a predetermined gap is formed between the predetermined surface and the facing surface, the plate springs applying elastic force to the valve body in accordance with an amount of movement of the valve body in the predetermined direction, and (d) an actuator for reciprocating the valve body in the predetermined direction in a non-contact manner, the method comprising:
- finishing each of the predetermined surface of the valve body and the facing surface of the main body to have a predetermined degree of flatness;
- supporting the valve body by the pair of plate springs such that the predetermined surface and the facing surface have a predetermined degree of parallelism therebetween; and
- fixing the pair of plate springs to the opposite ends of the main body in a state in which a gap jig having a thickness according to a size of the predetermined gap is inserted between the predetermined surface and the facing surface, and then removing the gap jig.

10. A method for manufacturing the flow path switching valve including (a) a valve body in a shape of a rectangular parallelepiped which has a predetermined surface and an opposite surface located opposite the predetermined surface, the valve body including an open flow passage formed through the valve body, the open flow passage having a first opening on the predetermined surface and a second opening on the opposite surface, the first and second openings respectively having a predetermined length in a predetermined direction, the valve body having a pair of opposite ends along the predetermined direction, (b) a first main body having a plurality of first ports arranged in the predetermined direction at intervals shorter than the predetermined length, the plurality of first ports having a respective opening on a first facing surface of the first main body facing the predetermined surface, and a plurality of first connection flow passages each connected to respective one of the plurality of first ports, (c) a second main body having a plurality of second ports arranged in the predetermined direction at intervals shorter than the predetermined length, each second port having a respective opening on a second facing surface of the second main body facing the opposite surface, and a plurality of second connection flow passages each connected to respective one of the plurality of second ports, (d) a pair of plate springs attached to the opposite ends of the valve body, respectively, so as to support the valve body such that a first predetermined gap is formed between the predetermined surface and the first facing surface, and that a second predetermined gap is formed between the opposite surface and the second facing surface, the plate springs applying elastic force to the valve body in accordance with an amount of movement of the valve body in the predetermined direction, and (e) an actuator for reciprocating the valve body in the predetermined direction in a non-contact manner, the method comprising:
- finishing each of the predetermined surface of the valve body and the facing surface of the main body to have a predetermined degree of flatness;
- finishing each of the opposite surface of the valve body and the second facing surface of the second main body to have a predetermined degree of flatness;
- supporting the valve body by the pair of plate springs such that the predetermined surface and the facing surface of the main body have a predetermined degree of parallelism therebetween, and the opposite surface and the second facing surface of the second main body have a predetermined degree of parallelism therebetween; and
- fixing the pair of plate springs to the main body in a state in which a first gap jig having a thickness according a size of the predetermined gap is inserted between the predetermined surface and the facing surface, and a second gap jig having a thickness according a size of the second predetermined gap is inserted between the opposite surface and the second facing surface, and then removing the first and second gap jigs.

* * * * *